(12) United States Patent
Ito et al.

(10) Patent No.: US 10,788,924 B2
(45) Date of Patent: Sep. 29, 2020

(54) LIGHT BEAM DIRECTION CONTROLLING TOUCH PANEL DEVICE

(71) Applicant: TIANMA JAPAN, LTD., Kawasaki, Kanagawa (JP)

(72) Inventors: Yuki Ito, Kawasaki (JP); Yukihiro Ito, Kawasaki (JP)

(73) Assignee: TIANMA JAPAN, LTD., Kawasaki, Kanagawa (JP)

( * ) Notice: Subject to any disclaimer, the term of this patent is extended or adjusted under 35 U.S.C. 154(b) by 83 days.

(21) Appl. No.: 16/197,724

(22) Filed: Nov. 21, 2018

(65) Prior Publication Data

US 2019/0155440 A1 May 23, 2019

(30) Foreign Application Priority Data

Nov. 22, 2017 (JP) .................................. 2017-225028

(51) Int. Cl.
 *G06F 3/041* (2006.01)
 *G02F 1/29* (2006.01)
 (Continued)

(52) U.S. Cl.
 CPC .............. *G06F 3/0416* (2013.01); *G02F 1/29* (2013.01); *G06F 3/044* (2013.01); *G06F 3/0412* (2013.01); *G06F 3/0445* (2019.05); *G06F 3/0446* (2019.05); *G06F 3/04166* (2019.05); *G09G 3/20* (2013.01); *G09G 3/344* (2013.01);
 (Continued)

(58) Field of Classification Search
 CPC ..................................................... G06F 3/0416
 See application file for complete search history.

(56) References Cited

U.S. PATENT DOCUMENTS

| | | | |
|---|---|---|---|
| 2008/0055221 A1 | 3/2008 | Yabuta et al. | |
| 2010/0123673 A1* | 5/2010 | Nam | G06F 3/0412 345/173 |

(Continued)

FOREIGN PATENT DOCUMENTS

| | | |
|---|---|---|
| JP | 2016-62091 A | 4/2016 |
| WO | 2006/030745 A1 | 3/2006 |

*Primary Examiner* — William Boddie
*Assistant Examiner* — Andrew B Schnirel
(74) *Attorney, Agent, or Firm* — Sughrue Mion, PLLC

(57) ABSTRACT

A light beam direction controlling touch panel device includes: upper light beam direction controlling electrodes and upper touch panel electrodes arranged on a bottom surface of an upper transparent substrate; lower touch panel electrodes disposed on a top surface of a lower transparent substrate; electrophoresis elements sandwiched between the upper light beam direction controlling electrodes and the lower touch panel electrodes; light-transmissive regions surrounded by the electrophoresis elements and sandwiched between the upper transparent substrate and the lower transparent substrate; and a controller, each of the upper light beam direction controlling electrodes include an opening that overlaps with the light-transmissive region, the controller supplies a driving potential to the lower touch panel electrodes in capacitance measurement for detecting a touch position; and supplies a driving potential to the upper light beam direction controlling electrodes based on the driving potential given to the lower touch panel electrodes.

10 Claims, 14 Drawing Sheets

(51) Int. Cl.
  *G06F 3/044* (2006.01)
  *G09G 3/34* (2006.01)
  *G09G 3/20* (2006.01)

(52) U.S. Cl.
  CPC ... *G02F 2201/12* (2013.01); *G09G 2300/023* (2013.01); *G09G 2320/068* (2013.01); *G09G 2354/00* (2013.01); *G09G 2358/00* (2013.01)

(56) References Cited

U.S. PATENT DOCUMENTS

| | | | |
|---|---|---|---|
| 2010/0156829 A1* | 6/2010 | Shimodaira | G06F 3/03545 345/173 |
| 2012/0062503 A1* | 3/2012 | Zhuang | G06F 3/0412 345/174 |
| 2012/0146943 A1* | 6/2012 | Fairley | G02F 1/167 345/174 |
| 2016/0004372 A1* | 1/2016 | Nakajima | G06F 3/044 345/174 |
| 2016/0077363 A1 | 3/2016 | Shiota | |
| 2016/0077364 A1* | 3/2016 | Shiota | G02F 1/133308 349/61 |
| 2017/0010516 A1* | 1/2017 | Shiota | G02F 1/167 |
| 2019/0102007 A1* | 4/2019 | Ito | G02F 1/13338 |
| 2019/0146604 A1* | 5/2019 | Uchiyama | G06F 3/044 345/175 |

* cited by examiner

LIGHT BEAM DIRECTION CONTROLLING TOUCH PANEL DEVICE

CROSS-REFERENCE TO RELATED APPLICATION

This Non-provisional application claims priority under 35 U.S.C. § 119(a) on Patent Application No. 2017-225028 filed in Japan on Nov. 22, 2017, the entire contents of which is hereby incorporated by reference.

BACKGROUND

The present disclosure relates to a light beam direction controlling touch panel device.

In recent years, against the background of widespread use of smart phones and tablet devices, a touch panel is more and more widely recognized as a user interface with high usability. Touch panels are used for the display unit of various electronic devices. In smartphones, ATMs, in-flight entertainment displays, and the like, a viewing angle control device is used so that the displayed content is not easily seen by other persons than the user.

When a touch panel and a viewing angle control device are individually installed on a display panel, the total thickness of the display device would increase due to the thickness of each component. In the configuration where a viewing angle control device is sandwiched between a touch panel and a display panel, the distance between the touch panel and the display panel becomes greater, which worsens the operability. In addition, because there would be more interfaces with air layers in the display device, the surface reflection by external light would worsen the visibility.

Patent Document 1 (WO2006/030745) discloses a display device equipped with a touch panel that can control the viewing angle. Specifically, Patent Document 1 discloses a display device that uses the first transparent electrode film, which is a component of SW-LCD that controls the viewing angle, for a touch panel, the display device having a position detection means configured to detect, when an object touches the surface of the first transparent electrode film, electric currents that flow from a plurality of places on the first transparent electrode film, and detect the touch positions of the object based on the detection results.

On the other hand, Patent Document 2 (Japanese Patent Application Laid-open Publication No. 2016-62091) discloses a light beam direction controlling device configured to electrically control the viewing angle by using an electrophoresis element.

SUMMARY

The touch panel of Patent Document 1 employs the surface electrostatic capacitance method, and therefore, it is difficult to achieve the multi-touch function. If a touch panel and a viewing angle controlling device that can electrically control the viewing angle are formed integrally and share a common substrate, the total thickness of the display device can be reduced, and it is possible to provide a display device with excellent viewing capability and touch panel usability. In order to achieve this, a technique to integrate the multi-touch enabled touch panel and a viewing angle controlling device that can electrically control the viewing angle so as to share a common substrate is needed.

A light beam direction controlling touch-panel device of the present disclosure includes an upper transparent substrate; a lower transparent substrate; a plurality of upper light beam direction controlling electrodes and a plurality of upper touch panel electrodes arranged alternately along a first direction on a bottom surface of the upper transparent substrate; a plurality of lower touch panel electrodes disposed on a top surface of the lower transparent substrate and facing the upper light beam direction controlling electrodes; a plurality of electrophoresis elements sandwiched between the plurality of upper light beam direction controlling electrodes and the plurality of lower touch panel electrodes, each of the plurality of electrophoresis elements including colored electrophoresis particles and dispersion medium; a plurality of light-transmissive regions sandwiched between the upper transparent substrate and the lower transparent substrate, the plurality of light-transmissive regions surrounded by the electrophoresis elements; and a controller, the plurality of upper light beam direction controlling electrodes each include an opening that overlaps in position with the light-transmissive region, the controller is configured to: supply a driving potential to the plurality of lower touch panel electrodes in capacitance measurement for detecting a touch position, thereby forming an electric field from the plurality of lower touch panel electrodes to the plurality of upper touch panel electrodes through the opening; and supply a driving potential to the plurality of upper light beam direction controlling electrodes in accordance with the driving potential given to the plurality of lower touch panel electrodes, thereby switching between a dispersed state and a concentrated state of the colored electrophoresis particles in the plurality of electrophoresis elements.

It is to be understood that both the foregoing general description and the following detailed description are exemplary and explanatory and are not restrictive of this disclosure.

BRIEF DESCRIPTION OF THE DRAWINGS

The present disclosure can be appreciated by the description which follows in conjunction with the following figures, wherein.

DETAILED DESCRIPTION OF THE EMBODIMENTS

Figure 1:
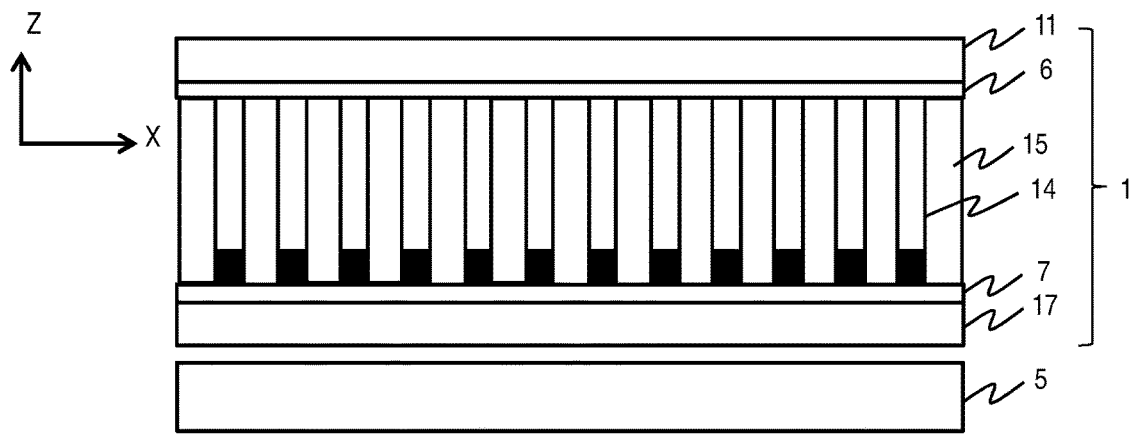
FIG. 1 is a cross-sectional view schematically illustrating a configuration example of a display device according to Embodiment 1.

Below, embodiments of the present invention are explained in detail with reference to the appended figures. Embodiments of the present invention are mere examples to implement the present invention, and shall not be interpreted to limit the technical scope of the present invention. In the respective figures, the same configurations are given the same reference characters. For ease of explanation, the dimensions and shapes of the illustrated parts and configurations are not necessarily true.

The light beam direction controlling touch panel disclosed below includes an upper transparent substrate, a lower transparent substrate, and an electrophoresis element arranged between the upper transparent electrode and the lower transparent electrode. The electrophoresis element includes colored electrophoresis particles having surface charge and light shielding properties, and a translucent dispersion medium. The light beam direction controlling touch panel has a narrow viewing angle mode and a wide viewing angle mode. In the narrow viewing angle mode, colored electrophoresis particles are diffused in the dispersion medium. On the other hand, in the wide viewing angle mode, colored electrophoresis particles are concentrated in certain places.

On the bottom surface of the upper transparent substrate (or in other words, the surface facing the lower transparent substrate), the upper electrode is disposed. The upper electrode includes an upper touch panel electrode for detecting the touch position and an upper light beam direction controlling electrode for controlling the light beam direction. The upper light beam direction controlling electrode has an opening formed therein.

On the top surface of the lower transparent substrate (or in other words, the surface facing the upper transparent substrate), the lower electrode is disposed. The lower electrode includes a lower touch panel electrode that faces the upper light beam direction controlling electrode and that receives a signal (potential) to enable the touch panel function. The lower electrode also includes a lower light beam direction controlling electrode that faces the upper touch panel electrode and that is configured to control the light beam direction.

The electrophoresis element is sandwiched between the upper electrode and the lower electrode. The controller gives a driving potential to each touch panel electrode in the capacity measurement for detecting touch positions, and gives a potential to the light beam direction controlling electrode in accordance with the driving potential. This way, the touch position can be detected while maintaining the status of the colored electrophoresis particles for the desired viewing angle mode.

The lower touch panel electrode is given a signal (potential) to achieve the touch panel function. In this state, if an object touches the upper transparent substrate, an electric field is formed from the lower touch panel electrode to the upper touch panel electrode via the opening of the upper light beam direction controlling electrode that faces the lower touch panel electrode. The touch panel function is made possible by this electric field.

As described above, each touch panel electrode also functions as the light beam direction control electrode. Thus, it is necessary to give each light beam direction controlling electrode a potential for appropriately controlling the electrophoresis element in accordance with the potential of each touch panel electrode.

In order to make each touch panel electrode double as the touch panel part and the light control panel part, the light beam direction controlling touch panel of the present invention employs the projection electrostatic capacity method. In the touch panel of the projection electrostatic capacity method, the touch position of an object is detected by identifying a change in electrostatic capacity between the electrode and an object.

Embodiment 1

<Configuration>

Figure 2:
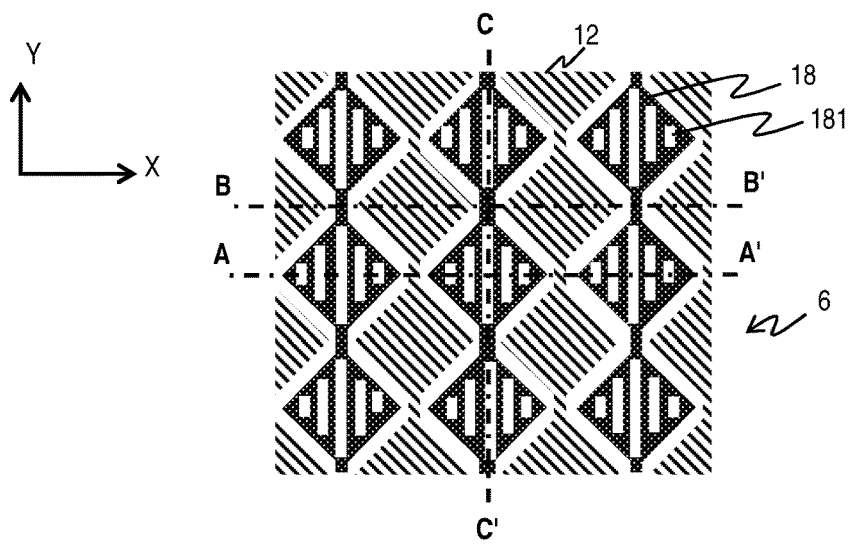
FIG. 2 is a plan view schematically illustrating a configuration example of an upper electrode according to Embodiment 1.
Figure 3:
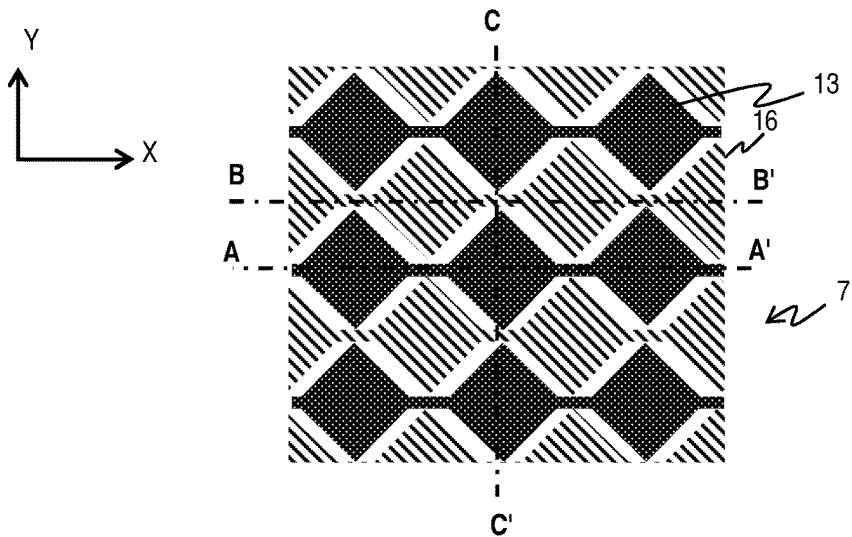
FIG. 3 is a plan view schematically illustrating a configuration example of a lower electrode according to Embodiment 1.

FIG. 1 is a cross-sectional view schematically illustrating a configuration example of the display device. FIG. 2 is a plan view schematically illustrating a configuration example of the upper electrode. FIG. 3 is a plan view schematically illustrating a configuration example of the lower electrode. The display device includes a display panel 5 and a light beam direction controlling touch panel 1 disposed in front of the display panel 5. The display panel 5 may be of any type. Examples of the display panel 5 include a liquid crystal display panel and an OLED (organic light emitting diode) display panel.

In this specification, the side closer to the user who views an image on the display panel 5, or in other words, the side toward which light beam of the image travels is referred to as the upper side, and the opposite side is referred to as the rear side or lower side. Also, the direction perpendicular to the primary surface of the display panel 5 and the light beam direction controlling touch panel 1 is the Z-axis direction, and two directions perpendicular to each other and horizontal to the primary surface are respectively the X-axis direction (first direction) and the Y-axis direction (second direction). The Z-axis direction is the direction along which the display panel 5 and the light beam direction controlling touch panel 1 are stacked.

The light beam direction controlling touch panel 1 has the touch panel function and the function to control the direction of light beam that passes through the light beam direction controlling touch panel 1 among the light beams from the display panel 5. The light beam direction controlling touch panel 1 can allow through the image of the display panel 5, switching between the wide viewing angle mode and the narrow viewing angle mode. The state (mode) where the range of the output direction from the light beam direction controlling touch panel 1 is wider is referred to as the wide viewing angle state (wide viewing angle mode), and the state (mode) where the range of the output direction is narrower is referred to as the narrow viewing angle state (narrow viewing angle mode).

In the example of FIG. 1, the light beam direction controlling touch panel 1 is in the wide viewing angle state. In the light beam direction controlling touch panel 1, the state of the colored electrophoresis particles (colored charged particles) changes, thereby adjusting the range of the output direction of the light passing through the light-transmissive regions 15 and the dispersion medium.

The light beam direction controlling touch panel 1 is bonded to the front surface (top surface) of the display panel 5 by a bonding layer, for example. The bonding layer between the light beam direction controlling touch panel 1 and the display panel 5 may be omitted. An air gap or any optical film may be alternatively disposed between the light beam direction controlling touch panel 1 and the display panel 5.

The light beam direction controlling touch panel 1 includes an upper transparent substrate 11 and a lower transparent substrate 17. The bottom surface of the lower transparent substrate 17 faces the display panel 5, and the top surface thereof faces the bottom surface of the upper transparent substrate 11. The upper transparent substrate 11 and the lower transparent substrate 17 are each formed of a light-transmitting material such as glass, PET (polyethylene terephthalate), PC (poly-carbonate), or PEN (polyethylene naphthalate), for example. The upper transparent substrate 11 and the lower transparent substrate 17 are each an inflexible or flexible insulator.

The light beam direction controlling touch panel 1 further includes an upper electrode 6 disposed on the bottom surface of the upper transparent substrate 11, and a lower electrode 7 disposed on the top surface of the lower transparent substrate 17. As illustrated in FIG. 2, the upper electrode 6 is constituted of a plurality of upper touch panel electrodes 12 and a plurality of upper light beam direction controlling electrodes 18. As illustrated in FIG. 3, the lower electrode 7 is constituted of a plurality of lower touch panel electrodes 13 and a plurality of lower light beam direction controlling electrodes 16. The upper touch panel electrodes 12, the upper light beam direction controlling electrodes 18, the lower touch panel electrodes 13, and the lower light beam direction controlling electrodes 16 are transparent electrodes, and are made of, for example, ITO (Indium Tin Oxide), ZnO, or IGZO.

The plurality of lower light beam direction controlling electrodes 16 (lower light beam direction controlling electrode pattern) respectively extend in the X-axis direction on the lower transparent substrate 17, and are arrayed at a certain interval along the Y-axis direction. Each of the lower light beam direction controlling electrodes 16 has a shape where a plurality of diamond-shaped (or square-shaped) electrode pieces are connected to each other, the plurality of electrode pieces being arranged in the same orientation in the X-axis direction, for example (so that each vertex faces the X-axis direction or the Y-axis direction, for example).

The plurality of lower touch panel electrodes 13 (lower touch panel electrode pattern) respectively extend in the X-axis direction on the lower transparent substrate 17, and are arrayed at a certain interval along the Y-axis direction. In a manner similar to the lower light beam direction controlling electrodes 16, each of the lower touch panel electrodes 13 has a shape where a plurality of diamond-shaped (or square-shaped) electrode pieces are connected to each other, the plurality of electrode pieces being arranged in the same orientation in the X-axis direction, for example (so that each vertex faces the X-axis direction or the Y-axis direction, for example). As described in detail later, the lower touch panel electrode 13 also functions as the light beam direction controlling electrode.

The lower light beam direction controlling electrodes 16 and the lower touch panel electrodes 13 are arranged alternately along the Y-axis direction. For example, each lower light beam direction controlling electrode 16 and each lower touch panel electrodes 13 adjacent to each other are arranged so as to have a gap therebetween. The gap between the lower light beam direction controlling electrode 16 and the lower touch panel electrode 13 may be filled with an insulating material (such as silicon nitrogen), or remain unfilled. As described in detail later, the lower touch panel electrode 13 also functions as the light beam direction controlling electrode.

The plurality of upper touch panel electrodes 12 (upper touch panel electrode pattern) respectively extend in the Y-axis direction on the upper transparent substrate 11, and are arrayed at a certain interval along the X-axis direction. Each of the upper touch panel electrodes 12 has a shape where a plurality of diamond-shaped (or square-shaped) electrode pieces are connected to each other, the plurality of electrode pieces being arranged in the same orientation in the Y-axis direction, for example (so that each vertex faces the X-axis direction or the Y-axis direction, for example). In this embodiment, each electrode piece of the upper touch panel electrode 12 faces a corresponding electrode piece of the lower light beam direction controlling electrode 16. For example, the respective electrode pieces facing each other are in substantially the same shape and same size. As described in detail later, the upper touch panel electrode 12 also functions as the light beam direction controlling electrode.

The plurality of upper light beam direction controlling electrodes 18 (upper light beam direction controlling electrode pattern) respectively extend in the Y-axis direction on the upper transparent substrate 11, and are arrayed at a certain interval along the X-axis direction. In a manner similar to the upper touch panel electrodes 12, each of the upper light beam direction controlling electrodes 18 has a shape where a plurality of diamond-shaped (or square-shaped) electrode pieces are connected to each other, the plurality of electrode pieces being arranged in the same orientation in the Y-axis direction, for example (so that each vertex faces the X-axis direction or the Y-axis direction, for example). In this embodiment, each electrode piece of the upper light beam direction controlling electrode 18 faces a corresponding electrode piece of the lower touch panel electrode 13. For example, the respective electrode pieces facing each other are in substantially the same shape and same size.

The upper light beam direction controlling electrodes 18 and the upper touch panel electrodes 12 are arranged alternately along the X-axis direction. For example, each upper light beam direction controlling electrode 18 and each upper touch panel electrodes 12 adjacent to each other are arranged so as to have a gap therebetween. The gap between the upper light beam direction controlling electrode 18 and the upper touch panel electrode 12 may be filled with an insulating material (such as silicon nitrogen), or remain unfilled.

The upper light beam direction controlling electrode 18 has openings 181 formed therein. In the example of FIG. 2, each of the electrode pieces of the upper light beam direction controlling electrodes 18 has a plurality of openings 181 in a rectangular shape where the Y-axis direction is the longitudinal direction. The shape of the openings 181 is not limited to a rectangular shape, and the openings 181 may be formed in any shape.

The light beam direction controlling touch panel 1 includes a light beam direction controlling layer between the upper transparent substrate 11 and the lower transparent substrate 17. The light beam direction controlling layer is constituted of a plurality of electrophoresis elements 14 and a plurality of light-transmissive regions 15. The electrophoresis elements 14 and the light-transmissive regions 15 respectively extend in the Y-axis direction, and arrayed alternately along the X-axis direction In the XY plane, the plurality of electrophoresis elements 14 have a striped pattern where the respective elements extend in the Y-axis direction, and are arrayed in the X-axis direction. Similarly, the plurality of light-transmissive regions 15 have a striped pattern where the respective regions extend in the Y-axis direction, and are arrayed in the X-axis direction.

The height of the light-transmissive region 15 is 3 μm to 300 μm, for example. The width of the light-transmissive region 15 is 1 μm to 150 μm, for example, and the pitch of the light-transmissive region 15 is 0.25 μm to 40 μm, for example. The width of the upper touch panel electrode 12, the upper light beam direction controlling electrode 18, the lower touch panel electrode 13, and the lower light beam direction controlling electrode 16 is 5 μm to 10 μm, for example, if the material is metal, and if the material is ITO, the width thereof is approximately 100 μm, for example. The pitch of the upper touch panel electrode 12, the upper light beam direction controlling electrode 18, the lower touch panel electrode 13, and the lower light beam direction controlling electrode 16 is several mm (specifically, approximately 5 mm), for example.

Each electrophoresis element 14 includes electrophoresis particles contained in a space formed between the light-transmissive regions 15, and a dispersion medium (electrophoresis element material). The electrophoresis particles are colored, and the color is black, for example. The dispersion medium is formed of a clear liquid material.

Each electrophoresis element is sandwiched between the upper electrode 6 and the lower electrode 7. In the example of FIG. 1, the upper electrode 6 and the lower electrode 7 contact an electrophoresis element material made from the electrophoresis particles and the dispersion medium. An insulating layer may be formed between the electrophoresis element material and one or both the upper electrode 6 and the lower electrode 7. The insulating layer is made of silicon oxide or silicon nitride, for example.

In the example of FIG. 1, the light beam direction controlling touch panel 1 is in the wide viewing angle state. The wide viewing angle state is realized by making the electrophoresis particles concentrated near one of the electrodes sandwiching the electrophoresis element 14, or in other words, the lower electrode 7, for example. In this case, a large part of the electrophoresis element 14 only includes the transparent dispersion medium, which allows light to go through the electrophoresis element 14. As a result, light beams of a wider range of the output angle in the X-axis direction pass through the light beam direction controlling touch panel 1.

In the wide viewing angle state, the relative potential of the lower electrode 7 with respect to the upper electrode 6 has the polarity opposing to the electrical charge of the electrophoresis particles (potential difference V). This makes the electrophoresis particles concentrated near the lower electrode 7.

When the electrical charge of the electrophoresis particles is negative (−), for example, the lower electrode 7 and the upper electrode 6 are applied with a potential such that the lower electrode 7 has the positive polarity. When the electrical charge of the electrophoresis particles is positive (+), for example, the lower electrode 7 and the upper electrode 6 are applied with a potential such that the lower electrode 7 has the negative polarity. In the descriptions below, the electrical charge of the electrophoresis particles is negative. If the electrical charge of the electrophoresis particles is positive, the same configuration can apply by reversing the polarity of the lower electrode 7.

On the other hand, in the narrow viewing angle state, the electrophoresis particles in each of the electrophoresis elements 14 are dispersed in the dispersion medium. The dispersed electrophoresis particles absorb light from the display panel 5, which makes the electrophoresis element 14 block light from the display panel 5. As a result, light beams of a narrower range of the output angle in the X-axis direction pass through the light beam direction controlling touch panel 1.

In the narrow viewing angle state, the potentials of the upper electrode 6 and the lower electrode 7 sandwiching each electrophoresis element 14 are maintained the same. This way, the electrophoresis particles remain dispersed in the dispersion medium. The upper electrode 6 is configured to receive a particular signal for the touch panel function. How to control the potentials of the upper electrode 6 and the lower electrode 7 is described in detail below.

Figure 4:
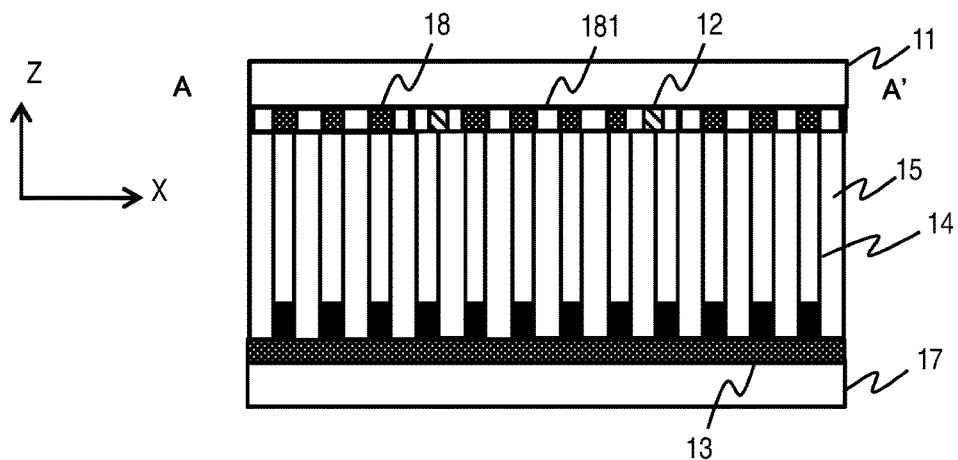
FIG. 4 is a cross-sectional view illustrating an example of the cross-sectional structure of a light beam direction controlling touch panel in the wide viewing angle state, taken along the line AA' of FIGS. 2 and 3.
Figure 5:
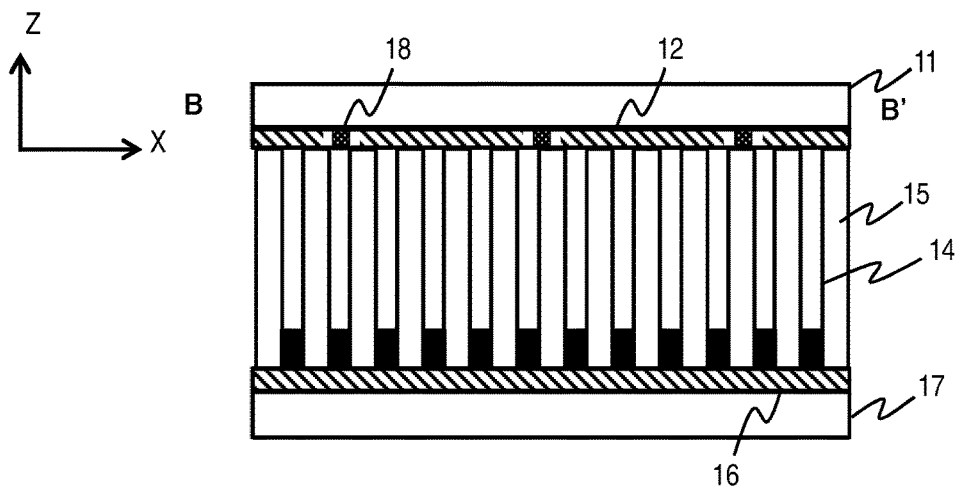
FIG. 5 is a cross-sectional view illustrating an example of the cross-sectional structure of the light beam direction controlling touch panel, taken along the line BB' of FIGS. 2 and 3.
Figure 6:
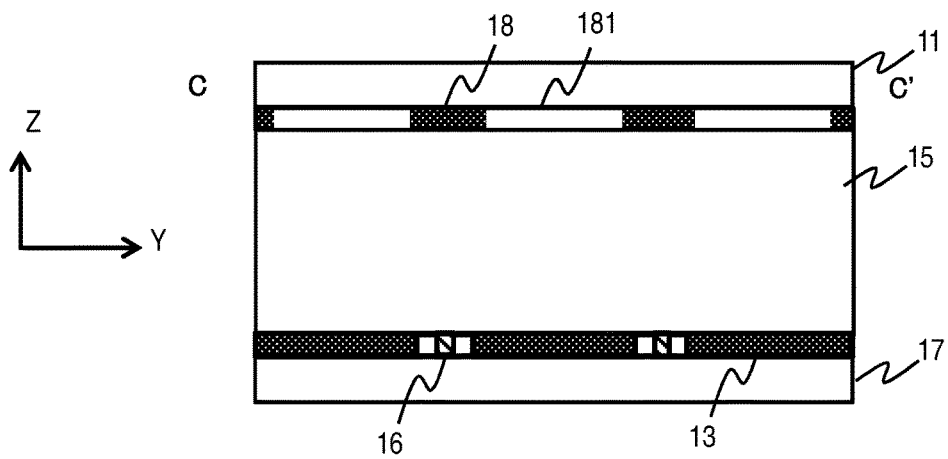
FIG. 6 is a cross-sectional view illustrating an example of the cross-sectional structure of the light beam direction controlling touch panel, taken along the line CC' of FIGS. 2 and 3.

FIG. 4 is a cross-sectional view illustrating an example of the cross-sectional structure of the light beam direction controlling touch panel 1 in the wide viewing angle state, taken along the line AA' of FIGS. 2 and 3. FIG. 5 is a cross-sectional view illustrating an example of the cross-sectional structure of the light beam direction controlling touch panel 1, taken along the line BB' of FIGS. 2 and 3. FIG. 6 is a cross-sectional view illustrating an example of the cross-sectional structure of the light beam direction controlling touch panel 1, taken along the line CC' of FIGS. 2 and 3.

The openings 181 formed in the upper light beam direction controlling electrodes 18 are formed so as to overlapping in position with the light-transmissive region 15. It is preferable that the openings 181 do not overlap the electrophoresis elements 14. Thus, it is preferable that the width (in the X-axis direction) of the openings 181 be smaller than the width of the light-transmissive region 15. All the electrophoresis elements 14 are sandwiched by at least one upper touch panel electrode 12 or upper light beam direction controlling electrode 18, and at least one lower touch panel electrode 13 or lower light beam direction controlling electrode 16.

Figure 7:
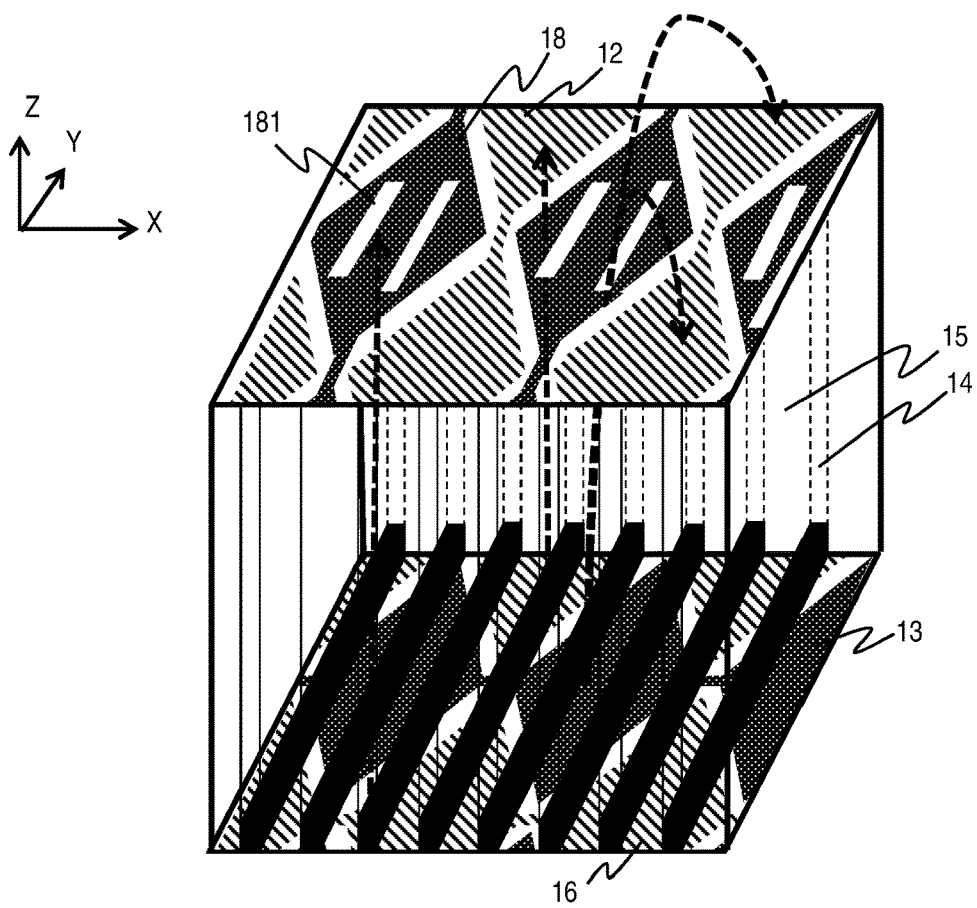
FIG. 7 is a perspective view schematically illustrating a configuration example of the light beam direction controlling touch panel according to Embodiment 1.

FIG. 7 is a perspective view schematically illustrating a configuration example of the light beam direction controlling touch panel 1. For ease of explanation, the upper transparent substrate 11 and the lower transparent substrate 17 are not illustrated in FIG. 7. The lower touch panel electrodes 13 are controlled to have a higher potential than the upper light beam direction controlling electrodes 18 facing the lower touch panel electrodes 13. The lower light beam direction controlling electrodes 16 are controlled to have a higher potential than the upper touch panel electrodes 12 facing the lower light beam direction controlling electrodes 16. This way, an electric field from the lower touch panel electrodes 13 to the non-opening areas of the upper light beam direction controlling electrodes 18 is formed, and an electric field from the lower light beam direction controlling electrodes 16 to the upper touch panel electrodes 12 is formed, which thereby realize the light beam direction controlling function.

In this state, if an object touches the upper transparent substrate 11, an electric field is formed from the lower touch panel electrodes 13 to the upper touch panel electrodes 12 via the openings 181 of the upper light beam direction controlling electrodes 18. The touch panel function is made possible by this electric field.

<Control>

Below, how the light beam direction controlling touch panel 1 controls the light beam direction is explained. As described above, the light beam direction controlling touch panel 1 has the touch panel function and the light beam direction controlling function. The upper touch panel electrodes 12 are given a signal (potential) to achieve the touch panel function. As described above, the upper touch panel electrodes 12 also function as the light beam direction controlling electrodes. Thus, it is necessary to give the lower touch panel electrodes 13 and the lower light beam direction controlling electrodes 16 a potential for appropriately controlling the electrophoresis elements 14 in accordance with the potential of the upper touch panel electrodes 12.

The light beam direction controlling touch panel 1 of the present invention employs the projection electrostatic capacity method. In the touch panel of the projection electrostatic capacity method, the touch position of an object is detected by identifying a change in electrostatic capacity between the electrode and the object.

The capacitance detection methods of the projection capacitance method include the self-capacitance detection method and the mutual capacitance detection method. A touch panel of the self-capacitance detection method includes a plurality of X electrodes (lower touch panel electrodes 13 of this embodiment) and a plurality of Y electrodes (upper touch panel electrodes 12 of this embodiment).

In the self-capacitance detection method, the X electrodes (lower touch panel electrodes 13 of this embodiment) and the Y electrodes (upper touch panel electrodes 12 of this embodiment) are independently driven, so that a change in electrostatic capacitance value at each electrode is detected. When an object gets closer to an electrode, the electrostatic capacitance of the electrode increases. In the self-capacitance method, the X electrode and Y electrode with increased electrostatic capacitance are detected, respectively, thereby detecting the position of the object.

A touch panel of the mutual capacitance method includes a transmission electrode as the driving electrode (X electrode, for example, and the lower touch panel electrodes 13 of this embodiment) and a reception electrode as the detection electrode (Y electrode, for example, and the upper touch panel electrodes 12 of this embodiment). Capacitance is formed at each intersection of the driving electrode and the detection electrode (intersection capacitance). If an object is present near the intersection capacitance, a part of the electric field at the intersection moves to the object. As a result, the intersection capacitance decreases. In the mutual capacitance method, the position of the object is detected by detecting the intersection at which a change in mutual capacitance has occurred and the size thereof.

Figure 8:
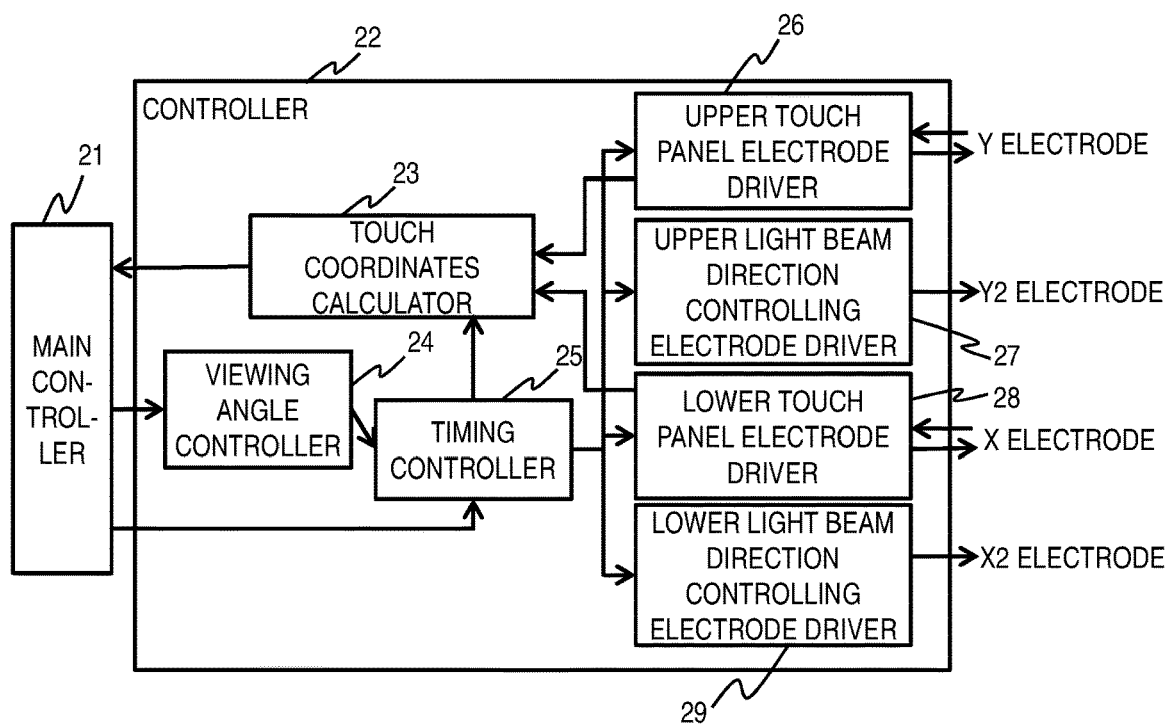
FIG. 8 is a block diagram schematically illustrating a logical configuration example of a control system of the light beam direction controlling touch panel according to Embodiment 1.

FIG. 8 is a block diagram schematically illustrating a logical configuration example of the control system of the light beam direction controlling touch panel 1. The light beam direction controlling touch panel 1 includes a main controller 21 and a controller 22. The controller 22 includes a touch coordinates calculator 23, a viewing angle controller 24, a timing controller 25, an upper touch panel electrode driver 26, an upper light beam direction controlling electrode driver 27, a lower touch panel electrode driver 28, and a lower light beam direction controlling electrode driver 29.

The respective units in the controller 22 and the main controller 21 respectively include a processor operating in accordance with a program and/or a logical circuit having a specific function. The touch coordinates calculator 23, the viewing angle controller 24, the timing controller 25, the upper touch panel electrode driver 26, the upper light beam direction controlling electrode driver 27, the lower touch panel electrode driver 28, and the lower light beam direction controlling electrode driver 29 may be constituted of individual circuits, respectively, or some or all of them may share the same circuit (including a processor).

The main controller 21 controls the touch coordinates calculator 23, the viewing angle controller 24, and the timing controller 25, for example. Specifically, the main controller 21 obtains the touch coordinates output by the touch coordinates calculator 23, for example. The main controller 21 controls the viewing angle controller 24 to switch between respective viewing angle modes (wide viewing angle mode/narrow viewing angle mode), for example. The main controller 21 controls the timing controller 25 to switch between respective touch detection modes (self-capacitance mode/mutual capacitance mode), for example.

In the mutual capacitance method, the touch coordinates calculator 23 calculates the touch coordinates by the object based on the drive signal received from the upper touch panel electrode 12 and the received signal received from the timing controller 25. In the self-capacitance method, the touch coordinates calculator 23 calculates the touch coordinates by the object based on the received signal received from the upper touch panel electrode 12 and the lower touch panel electrode 13, and the received signal received from the timing controller 25.

The viewing angle controller 24 notifies the timing controller 25 of the viewing angle mode. The timing controller 25 sends out a timing signal based on the viewing angle mode and the touch detection mode to the upper touch panel electrode driver 26, the upper light beam direction controlling electrode driver 27, the lower touch panel electrode driver 28, and the lower light beam direction controlling electrode driver 29.

The upper touch panel electrode driver 26, the upper light beam direction controlling electrode driver 27, the lower touch panel electrode driver 28, and the lower light beam direction controlling electrode driver 29 send out a driving signal (potential) to the corresponding electrodes, respectively, based on the timing signal. In the self-capacitance mode and the mutual capacitance mode, the lower touch panel electrode driver 28 receives a received signal of the lower touch panel electrode 13 and sends out the signal to the touch coordinates calculator 23. In the self-capacitance mode, the upper touch panel electrode driver 26 receives a received signal of the upper touch panel electrode 12 and sends out the signal to the touch coordinates calculator 23.

Figure 9:
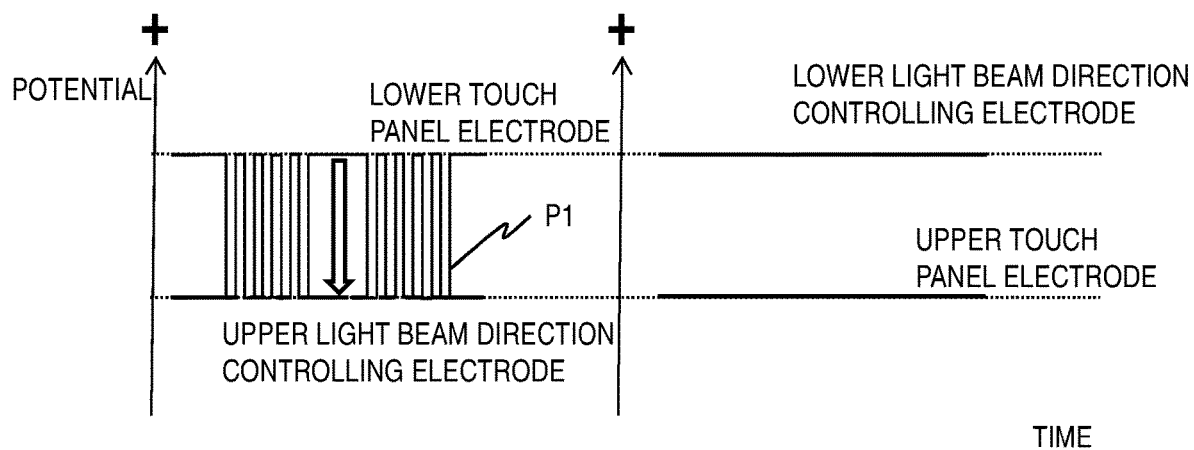
FIG. 9 is a diagram schematically illustrating the waveform of the driving signal given to each electrode in the wide viewing angle state.

FIG. 9 is a diagram schematically illustrating the waveform of the driving signal given to each electrode in the wide viewing angle state. The upper touch panel electrodes 12 and the upper light beam direction controlling electrodes 18 are applied with a constant reference potential (such as the ground potential), for example. The lower light beam direction controlling electrodes 16 are applied with a constant potential that is higher than the reference potential.

The lower touch panel electrodes 13 are applied with a touch panel driving signal of a rectangular wave having a pulse P1 of the negative direction, with reference to the potential given to the lower light beam direction controlling electrode 16, for example. The average potential of the rectangular wave is higher than the reference potential. During a period when that pulse is output, the upper light beam direction controlling electrodes 18 may be in a floating state so that electric fields are concentrated on the upper light beam direction controlling electrodes 18 more easily.

In the example of FIG. 9, the lower light beam direction controlling electrodes 16 are maintained at a higher potential than the upper touch panel electrodes 12 that face the lower light beam direction controlling electrodes 16, and the lower touch panel electrodes 13 are maintained at a higher potential than the upper light beam direction controlling electrodes 18 that face the lower touch panel electrodes 13. This way, the electrophoresis particles of the electrophoresis elements 14 are concentrated on the lower electrode 7, and the wide viewing angle state can be achieved.

While the pulse P1 is ON (while the pulse of the negative direction is output), the potential of the lower touch panel electrodes 13 and the potential of the upper light beam direction controlling electrodes 18 facing the lower touch panel electrodes 13 are the same, and therefore, if the pulse width is great, the electrophoresis particles may be dispersed therebetween. Thus, in order to maintain the wide viewing angle state, it is necessary to make the pulse width of the pulse P1 small enough so that the electrophoresis particles cannot follow. Specifically, for example, the pulse width is 1 µs to 30 µs. (The pulse P1 is given for charging the electrostatic capacitance, but the charge time is determined by the resistance of the sensor pattern and the resistance of the wiring, each capacity, and driving voltage. The pulse width that is mainly used is several micro-seconds (such as 1 to 3 µs)).

That is, the duty ratio of the pulse ON state (output state) in the entire rectangular wave is equal to or less than a predetermined value (the pulse width of P1 is set to be sufficiently shorter than the time (several seconds) for driving the electrophoretic elements 14, and the duty ratio is 1% or smaller, for example), and the output of the touch panel pulse is terminated before the electrophoretic particles move to such an extent that the viewing angle mode changes.

Figure 10A:
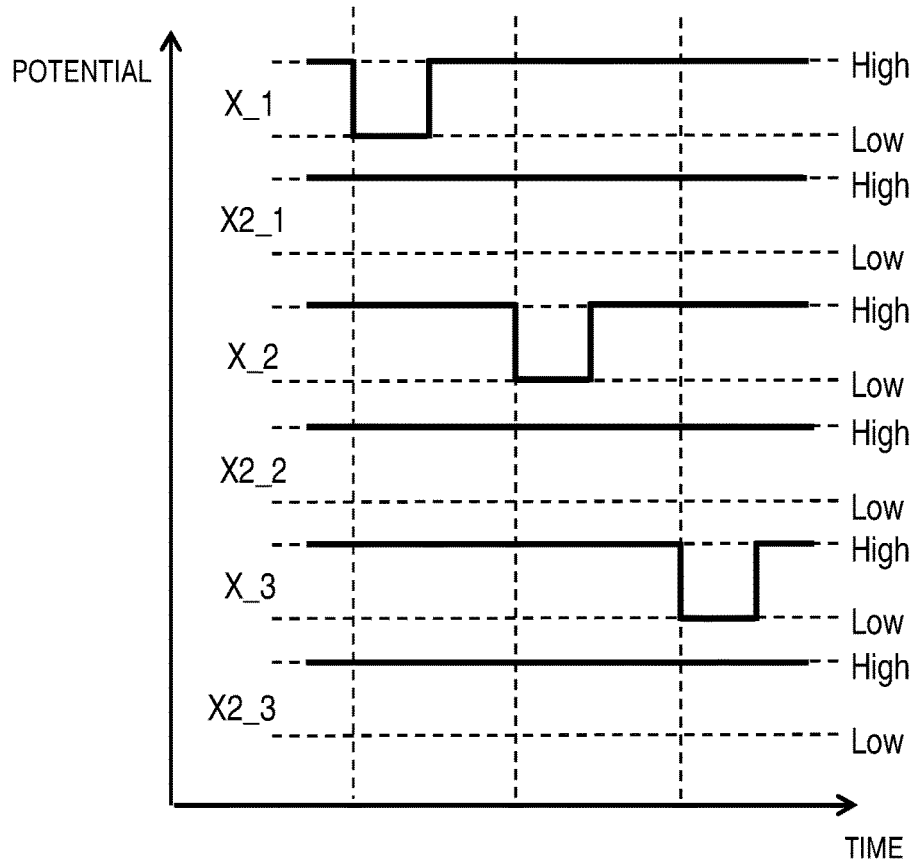
FIG. 10A illustrates an example of the waveform of the driving potential (driving signal) given to the lower electrode in the mutual capacitance mode and the wide viewing angle mode according to Embodiment 1.
Figure 10B:
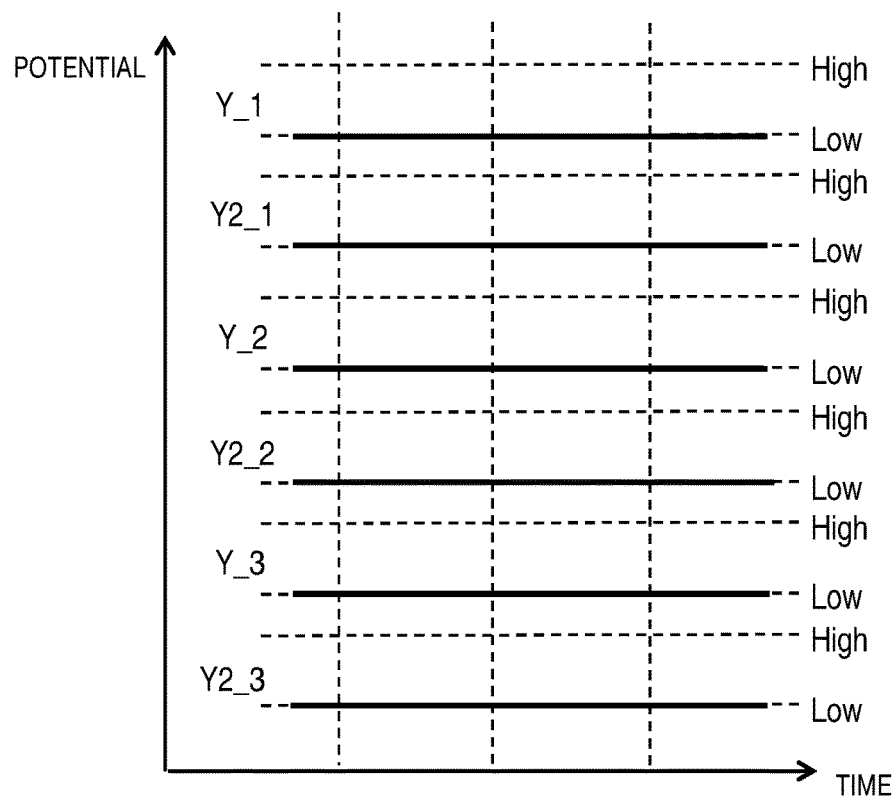
FIG. 10B illustrates an example of the waveform of the driving potential (driving signal) given to the upper electrode in the mutual capacitance mode and the wide viewing angle mode according to Embodiment 1.

FIG. 10A illustrates an example of the waveform of the driving potential (driving signal) given to the lower electrode 7 in the mutual capacitance mode and the wide viewing angle mode. FIG. 10B illustrates an example of the waveform of the driving potential (driving signal) given to the upper electrode 6 in the mutual capacitance mode and the wide viewing angle mode.

Below, the lower touch panel electrodes 13 are also referred to as the X_1 electrode, the X_2 electrode, the X_3 electrode, . . . , sequentially from the positive Y axis direction toward the opposite direction, and the lower light beam direction controlling electrodes 16 are also referred to as the X2_1 electrode, the X2_2 electrode, the X2_3 electrode, . . . sequentially from the positive Y axis direction toward the opposite direction. Similarly, the upper touch panel electrodes 12 are also referred to as the Y_1 electrode, the Y_2 electrode, the Y_3 electrode, . . . , sequentially from the negative X axis direction toward the opposite direction, and the upper light beam direction controlling electrodes 18 are also referred to as the Y2_1 electrode, the Y2_2 electrode, the Y2_3 electrode, . . . sequentially from the negative X axis direction toward the opposite direction.

After receiving a notification of the mutual capacitance mode from the main controller 21, and a notification of the wide viewing angle mode from the viewing angle controller 24, the timing controller 25 sequentially selects the lower touch panel electrodes 13. The timing controller 25 measures the capacitance of each of the upper touch panel electrodes 12 while giving the driving potential to the selected lower touch panel electrode 13. The timing controller 25 may measure the capacitance of the lower touch panel electrodes 12 by selecting one by one sequentially, or measure the capacitance between all the upper touch panel electrodes 12 and the selected lower touch panel electrode 13. The touch coordinates calculator 23 calculates the touch coordinates based on the measured capacitance.

In the example of FIG. 10A, the timing controller 25 selects the lower touch panel electrode 13 in the order of X_1 electrode, X_2 electrode, and X_3 electrode. As illustrated in FIG. 10A, an AC signal is sequentially given to the selected lower touch panel electrodes 13 for capacitance measurement. In the example of FIG. 10A, the driving signal given to the lower touch panel electrodes 13 is a rectangular wave emitting a pulse from a prescribed high potential (High in FIG. 10A) toward the negative direction.

The pulse is output in the same order as the selected electrodes, and the pulse output period of each lower touch panel electrode 13 does not overlap with each other. Also, as described above, the pulse width is too short for the electrophoresis particles to follow. The driving potential waveform for the capacitance measurement may be of any shape as long as it is appropriate for the touch detection by the light beam direction controlling touch panel 1.

The Y_1 electrode, Y_2 electrode, and Y_3 electrode, which are the upper touch panel electrodes 12, are given a constant low potential (Low in FIG. 10B). The X2_1 electrode, X2_2 electrode, and X2_3 electrode, which are the lower light beam direction controlling electrodes 16, are given a constant high potential (High in FIG. 10A), and the Y2_1 electrode, Y2_2 electrode, and Y2_3 electrode, which are the upper light beam direction controlling electrodes 18, are given a constant low potential (Low in FIG. 10B).

This way, as described above, the lower light beam direction controlling electrodes 16 are maintained at a higher potential than the upper touch panel electrodes 12 that face the lower light beam direction controlling electrodes 16, and the lower touch panel electrodes 13 are maintained at a higher potential than the upper light beam direction controlling electrodes 18 that face the lower touch panel electrode 13. This way, the electrophoresis particles of the electrophoresis elements 14 are concentrated on the lower electrode 7, and the wide viewing angle state can be achieved.

Figure 11A:
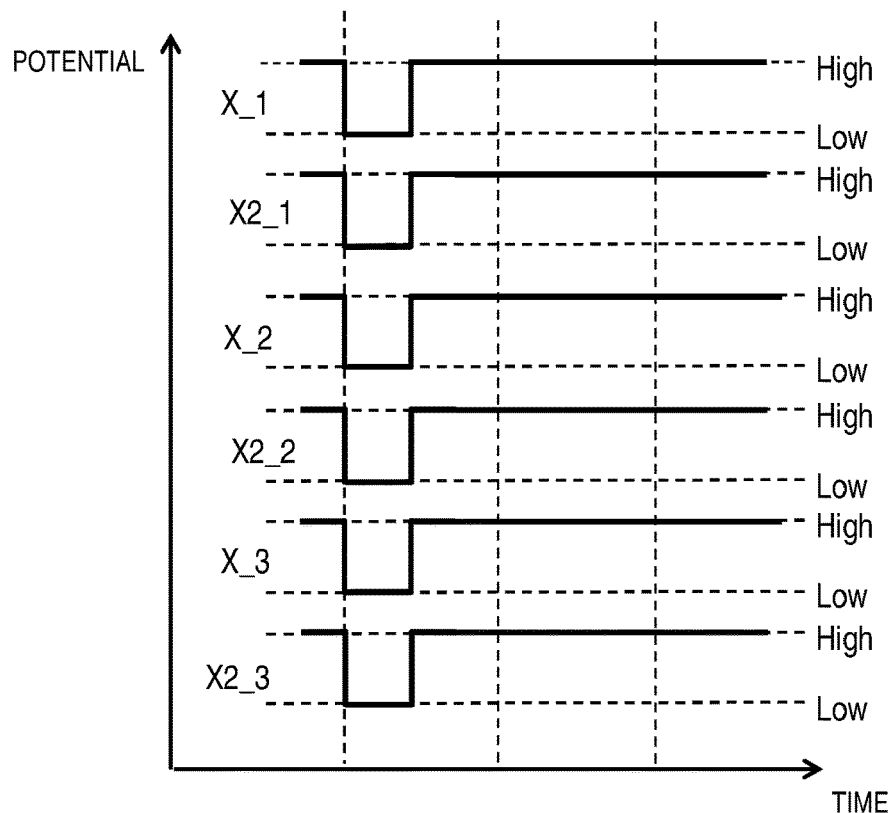
FIG. 11A illustrates an example of the waveform of the driving potential (driving signal) given to the lower electrode in the self-capacitance mode and wide viewing angle mode according to Embodiment 1.
Figure 11B:
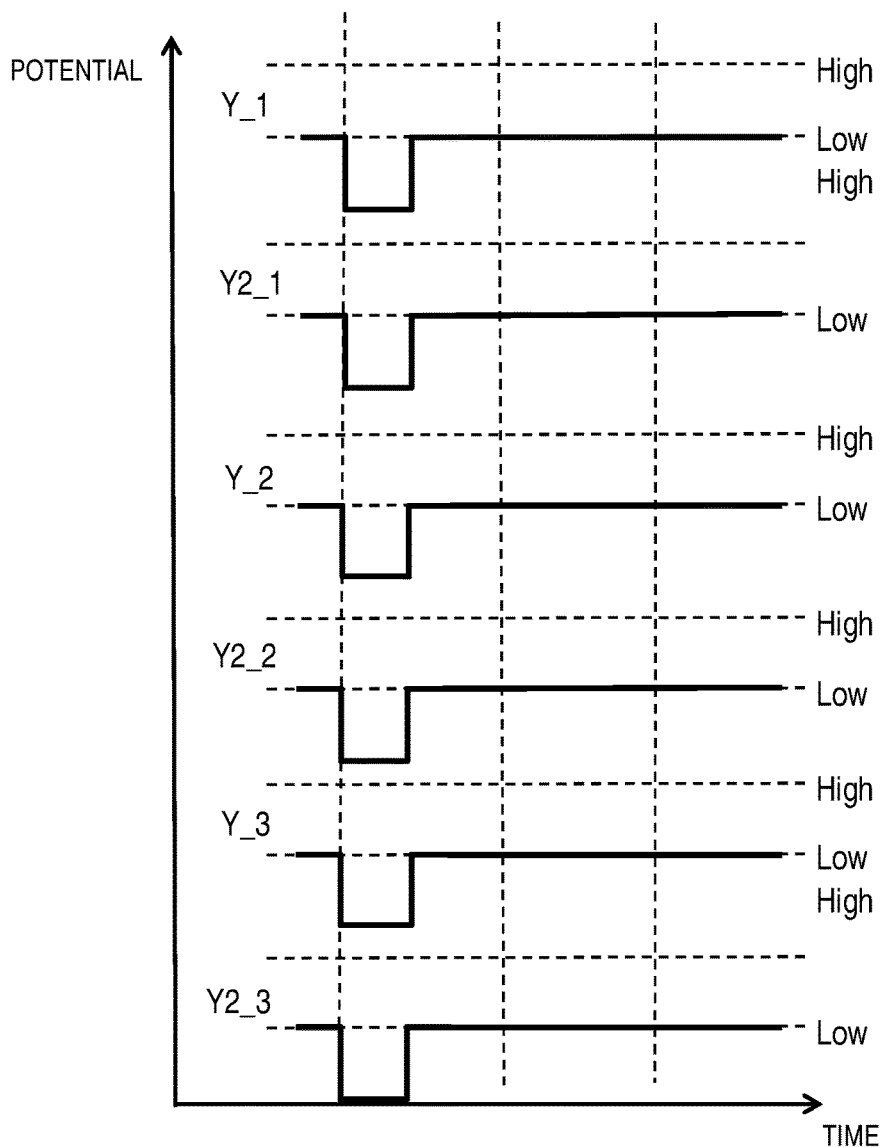
FIG. 11B illustrates an example of the waveform of the driving potential (driving signal) given to the upper electrode in the self-capacitance mode and the wide viewing angle mode according to Embodiment 1.

FIG. 11A illustrates an example of the waveform of the driving potential (driving signal) given to the lower electrode 7 in the self-capacitance mode and wide viewing angle mode. FIG. 11B illustrates an example of the waveform of the driving potential (driving signal) given to the upper electrode 6 in the self-capacitance mode and the wide viewing angle mode.

After receiving a notification of the self-capacitance mode from the main controller 21, and a notification of the wide viewing angle mode from the viewing angle controller 24, the timing controller 25 measures the capacitance of all the upper touch panel electrodes 12 and all the lower touch panel electrodes 13 while giving the driving potential to all the upper touch panel electrodes 12 and all the lower touch panel electrodes 13. Alternatively, the timing controller 25 may be configured to sequentially select each upper touch panel electrode 12 and lower touch panel electrode 13, and give the driving signal to the selected electrode to measure the capacitance. The touch coordinates calculator 23 calculates the touch coordinates based on the measured capacitance.

In the example of FIG. 11A, an AC signal is given to the lower touch panel electrodes 13 and the lower light beam direction controlling electrodes 16 at the same time. In the example of FIG. 11A, the driving signal given to each lower touch panel electrode 13 and each lower light beam direction controlling electrode 16 is a rectangular wave emitting a pulse from a prescribed high potential (High in FIG. 11A) toward the negative direction. The driving potential waveform for the capacitance measurement may be of any shape as long as it is appropriate for the touch detection by the light beam direction controlling touch panel 1.

The driving signal given to each upper touch panel electrode 12 and each upper light beam direction controlling electrode 18 is a rectangular wave emitting a pulse from a prescribed low potential (Low in FIG. 11B) toward the negative direction. This rectangular wave is in the same shape as the rectangular wave indicated by the driving signal given to the lower touch panel electrode 13 and the lower light beam direction controlling electrode 16. That is, in those rectangular waves, the pulse heights, pulse widths, and pulse start-up timings are all the same.

In the self-capacitance mode, all the electrodes are given the rectangular wave of the same shape, and therefore, in both of the periods when pulse is output and pulse is not output, the potential difference between the respective electrodes facing each other does not change. This allows the pulse width to be longer than that of the mutual capacitance mode (the pulse width is set to approximately 1 µs to 30 µs as in the mutual capacitance mode, for example, but the pulse width may be longer than that of the mutual capacitance mode).

This way, as described above, the lower light beam direction controlling electrodes 16 are maintained at a higher potential than the upper touch panel electrodes 12 that face the lower light beam direction controlling electrodes 16, and the lower touch panel electrodes 13 are maintained at a higher potential than the upper light beam direction controlling electrodes 18 that face the lower touch panel electrodes 13. This way, the electrophoresis particles of the electrophoresis elements 14 are concentrated on the lower electrode 7, and the wide viewing angle state can be achieved.

Figure 12:
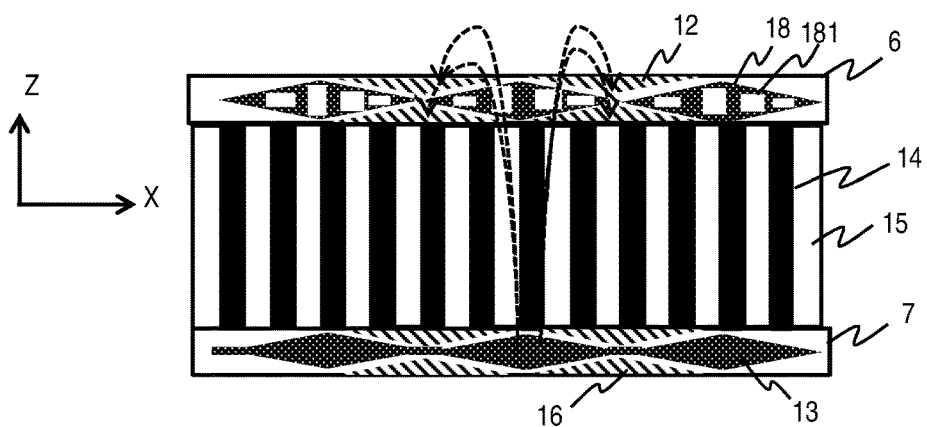
FIG. 12 is a cross-sectional view illustrating an example of the cross-sectional structure of the light beam direction controlling touch panel in the narrow viewing angle state according to Embodiment 1.

FIG. 12 is a cross-sectional view illustrating an example of the cross-sectional structure of the light beam direction controlling touch panel 1 in the narrow viewing angle state. For ease of explanation, in the example of FIG. 12, the bottom surface (XY plane) of the upper electrode 6 and the top surface (XY plane) of the lower electrode 7 are drawn on the XZ plane, and the upper transparent substrate 11 and the lower transparent substrate 17 are not illustrated.

Figure 13:
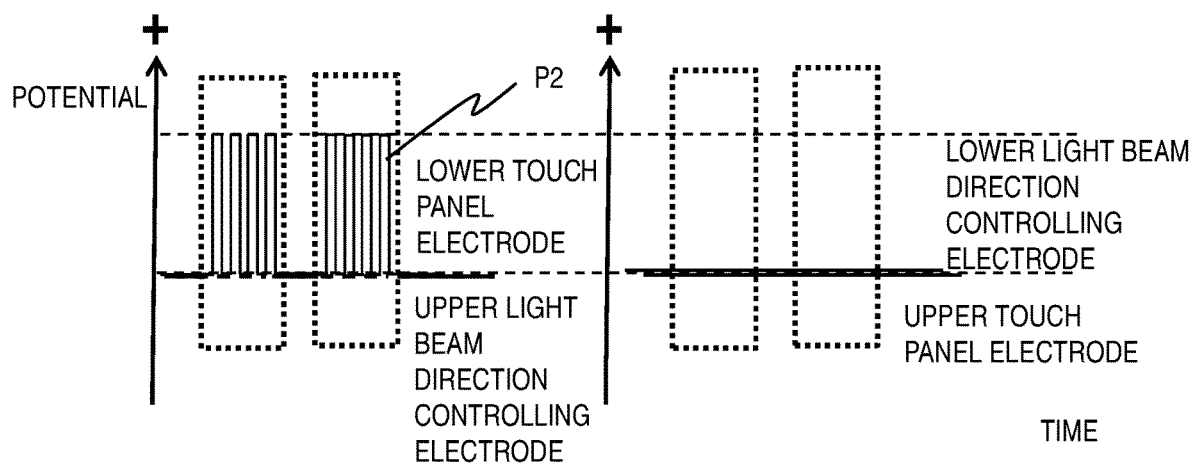
FIG. 13 is a diagram schematically illustrating the waveform of the driving signal given to each electrode in the narrow viewing angle state according to Embodiment 1.

FIG. 13 is a diagram schematically illustrating the waveform of the driving signal given to each electrode in the narrow viewing angle state. The upper touch panel electrodes 12, the lower light beam direction controlling electrodes 16, and the upper light beam direction controlling electrodes 18 are applied with a constant reference potential (such as the ground potential), for example. The lower touch panel electrodes 13 are applied with a touch panel driving signal of a rectangular wave having a pulse P2 of the positive direction, with reference to the constant reference potential, for example.

While the pulse P2 is ON (output state), the potential of the lower touch panel electrodes 13 is higher than the potential of the upper light beam direction controlling electrodes 18 facing the lower touch panel electrodes 13, and therefore, if the pulse width is great, the electrophoresis particles may be concentrated on the lower touch panel electrodes 13. Thus, in order to maintain the narrow viewing angle state, it is necessary to make the pulse width short enough so that the electrophoresis particles cannot follow.

Specifically, the pulse width is 1 µs to 30 µs, for example. That is, the duty ratio of the pulse OFF state (when the reference low potential is maintained) of the entire rectangular wave is set to a high level, and the output of the pulse for the touch panel is terminated before the electrophoresis particles move to such an extent that it affects the viewing angle mode.

As described above, the lower light beam direction controlling electrodes 16 are maintained at the same potential as the upper touch panel electrodes 12 that face the lower light beam direction controlling electrodes 16, and the lower touch panel electrodes 13 are maintained at the same potential as the upper light beam direction controlling electrodes 18 that face the lower touch panel electrodes 13. This way, the electrophoresis particles of the electrophoresis elements 14 are dispersed substantially evenly in the dispersion medium, and the narrow viewing angle state can be achieved.

As illustrated in FIG. 12, in this state, if an object touches the upper transparent substrate 11, a part of the electric field, which is formed from the lower touch panel electrodes 13 to the upper touch panel electrodes 12 via the openings 181 of the upper light beam direction controlling electrodes 18, is taken away by the object, which causes the capacitance to change. This makes possible the touch panel function.

Figure 14A:
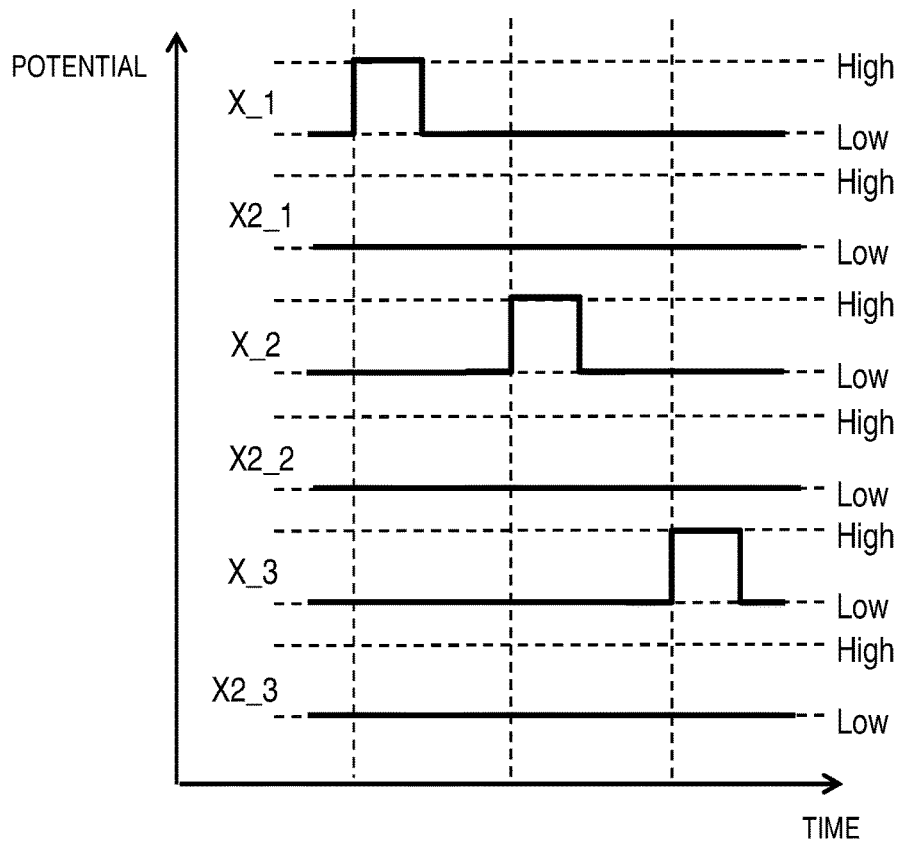
FIG. 14A illustrates an example of the waveform of the driving potential (driving signal) given to the lower electrode in the mutual capacitance mode and narrow viewing angle mode according to Embodiment 1.
Figure 14B:
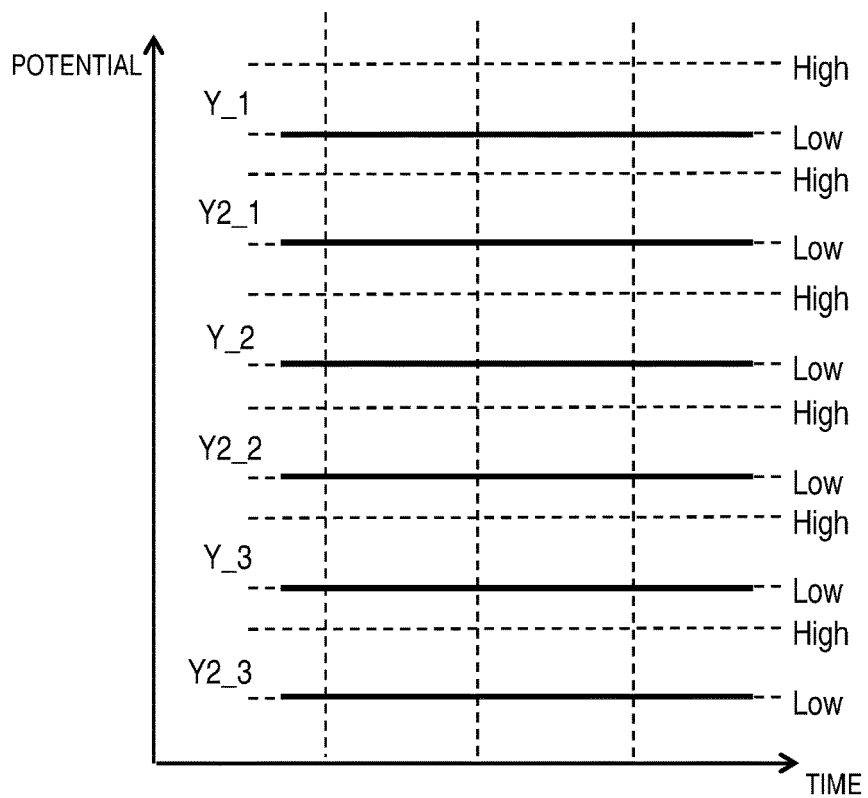
FIG. 14B illustrates an example of the waveform of the driving potential (driving signal) given to the upper electrode in the mutual capacitance mode and the narrow viewing angle mode according to Embodiment 1.

FIG. 14A illustrates an example of the waveform of the driving potential (driving signal) given to the lower electrode 7 in the mutual capacitance mode and narrow viewing angle mode. FIG. 14B illustrates an example of the waveform of the driving potential (driving signal) given to the upper electrode 6 in the mutual capacitance mode and the narrow viewing angle mode.

After receiving a notification of the mutual capacitance mode from the main controller 21, and a notification of the narrow viewing angle mode from the viewing angle controller 24, the timing controller 25 sequentially selects the lower touch panel electrodes 13. The timing controller 25 measures the capacitance of each of the upper touch panel electrodes 12 while giving the driving potential to the selected lower touch panel electrode 13. The timing controller 25 may measure the capacitance of the upper touch panel electrodes 12 by selecting one by one sequentially, or measure the capacitance between all the upper touch panel electrodes 12 and the selected lower touch panel electrode 13. The touch coordinates calculator 23 calculates the touch coordinates based on the measured capacitance.

In the example of FIG. 14A, the timing controller 25 selects the lower touch panel electrodes 13 in the order of X_1 electrode, X_2 electrode, and X_3 electrode. As illustrated in FIG. 14A, an AC signal is sequentially given to the selected lower touch panel electrode 13 for capacitance measurement. In the example of FIG. 14A, the driving signal given to the lower touch panel electrodes 13 is a rectangular wave emitting a pulse from a prescribed low potential (Low in FIG. 14A) toward the positive direction.

The pulse is output in the same order as the selected electrodes, and the pulse output periods of the respective lower touch panel electrodes 13 do not overlap with each other. Also, as described above, the pulse width is too short for the electrophoresis particles to follow. The driving potential waveform for the capacitance measurement may be of any shape as long as it is appropriate for the touch detection by the light beam direction controlling touch panel 1.

The Y_1 electrode, Y_2 electrode, and Y_3 electrode, which are the upper touch panel electrode 12, the X2_1 electrode, X2_2 electrode, and X2_3 electrode, which are the lower light beam direction controlling electrodes 16, and the Y2_1 electrode, Y2_2 electrode, and Y2_3 electrode, which are the upper light beam direction controlling electrodes 18 are given a constant low potential (Low in FIGS. 14A an 14B).

This way, as described above, the lower light beam direction controlling electrodes 16 are maintained at the same potential as the upper touch panel electrodes 12 that face the lower light beam direction controlling electrodes 16, and the lower touch panel electrodes 13 are maintained at the same potential as the upper light beam direction controlling electrodes 18 that face the lower touch panel electrodes 13. This way, the electrophoresis particles of the electrophoresis elements 14 are dispersed substantially evenly in the dispersion medium, and the narrow viewing angle state can be achieved.

Figure 15A:
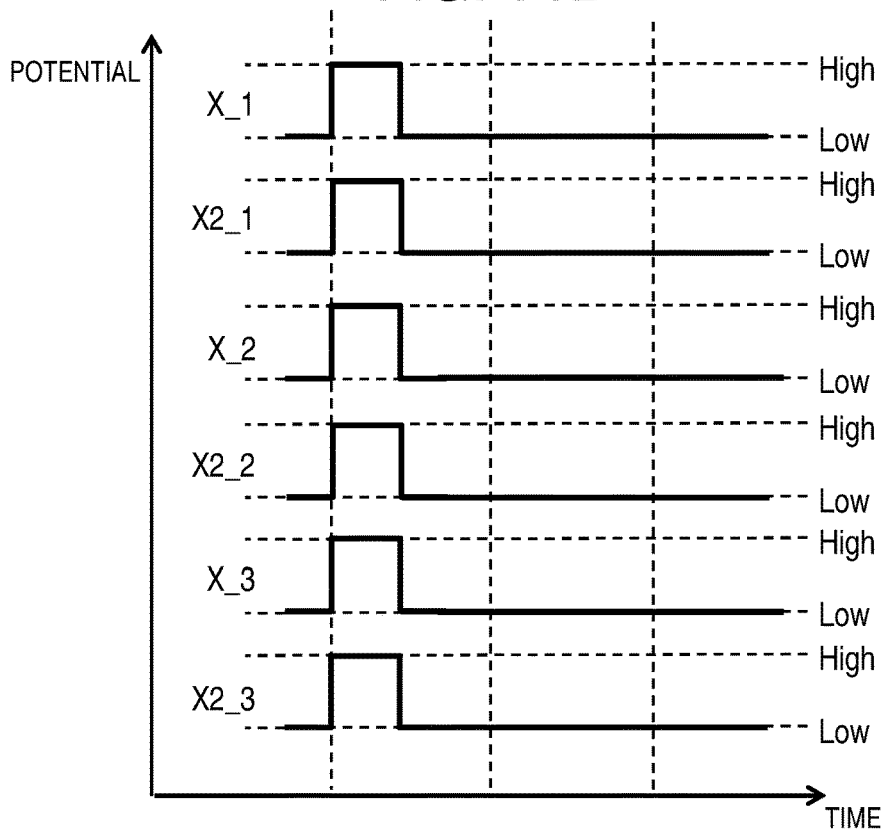
FIG. 15A illustrates an example of the waveform of the driving potential (driving signal) given to the lower electrode in the self-capacitance mode and narrow viewing angle mode according to Embodiment 1.
Figure 15B:
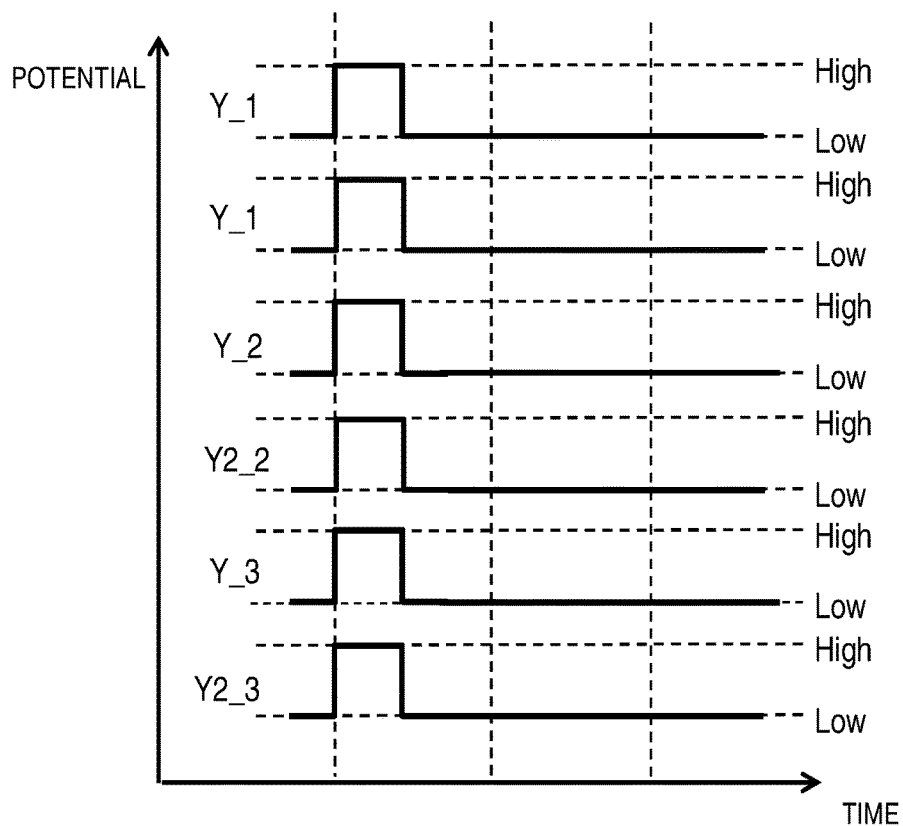
FIG. 15B illustrates an example of the waveform of the driving potential (driving signal) given to the upper electrode in the self-capacitance mode and the wide viewing angle mode according to Embodiment 1.

FIG. 15A illustrates an example of the waveform of the driving potential (driving signal) given to the lower electrode 7 in the self-capacitance mode and narrow viewing angle mode. FIG. 15B illustrates an example of the waveform of the driving potential (driving signal) given to the upper electrode 6 in the self-capacitance mode and the wide viewing angle mode.

After receiving a notification of the self-capacitance mode from the main controller 21, and a notification of the narrow viewing angle mode from the viewing angle controller 24, the timing controller 25 measures the capacitance of all the upper touch panel electrodes 12 and all the lower touch panel electrodes 13 while giving the driving potential to all the upper touch panel electrodes 12 and all the lower touch panel electrodes 13. Alternatively, the timing controller 25 may be configured to sequentially select each upper touch panel electrode 12 and lower touch panel electrode 13, and give the driving signal to the selected electrode to measure the capacitance. The touch coordinates calculator 23 calculates the touch coordinates based on the measured capacitance.

In the examples illustrated in FIGS. 15A and 15B, the lower touch panel electrodes 13, the lower light beam direction controlling electrodes 16, the upper touch panel electrodes 12, and the upper light beam direction controlling electrodes 18 are given an AC signal at the same time. In the example of FIGS. 15A and 15B, the driving signal given to each lower touch panel electrode 13, each lower light beam direction controlling electrode 16, each upper touch panel electrode 12, and each upper light beam direction controlling electrode 18 is a rectangular wave emitting a pulse from a prescribed low potential (Low in FIG. 15A) toward the positive direction. The driving potential waveform for the capacitance measurement may be of any shape as long as it is appropriate for the touch detection by the light beam direction controlling touch panel 1.

In the self-capacitance mode, all the electrodes are given the rectangular wave of the same shape, and therefore, in both of the periods when pulse is output and pulse is not output, the potential difference between the respective electrodes facing each other does not change. This allows the pulse width to be longer than that of the mutual capacitance mode (the pulse width is set to approximately 1 μs to 30 μs as in the mutual capacitance mode, for example, but the pulse width may be longer than that of the mutual capacitance mode).

This way, as described above, the lower light beam direction controlling electrodes 16 are maintained at the same potential as the upper touch panel electrodes 12 that face the lower light beam direction controlling electrodes 16, and the lower touch panel electrodes 13 are maintained at the same potential as the upper light beam direction controlling electrodes 18 that face the lower touch panel electrodes 13. This way, the electrophoresis particles of the electrophoresis elements 14 are dispersed substantially evenly in the dispersion medium, and the narrow viewing angle state can be achieved.

As described above, in the light beam direction controlling touch panel 1 of this embodiment, the projection type electrostatic capacitance touch panel and the viewing angle controlling device that can electrically control the viewing angle are integrally formed, and share the same substrate. This way, it is possible to achieve a light beam direction controlling touch panel with the multi-touch function. Also, because the thickness of the light beam direction controlling touch panel 1 is reduced, the distance between the touch part and the display panel 5 can be smaller. This reduces the difference between the display viewed through the touch panel and the actual display on the display panel, which improves the panel usability. Because there are less interfaces in the light beam direction controlling touch panel 1, the reduction in transmission rate is suppressed, and the visibility is improved.

The X electrode and the Y electrode of the touch panel function are arranged on the upper electrode 6 and the lower electrode 7, respectively (or in other words, the two electrodes are arranged on different planes), and therefore, it is not necessary to generate a bridge between the X electrode and the Y electrode. This makes it possible to reduce the number of manufacturing steps, and as a result, the manufacturing cost can be reduced.

Because the lower electrode 7 is disposed on the lower transparent substrate 17, noise from the display panel 5 to the upper transparent substrate 11 can be reduced.

Embodiment 2

The light beam direction controlling touch panel 1 of this embodiment differs from Embodiment 1 in the driving method in the wide viewing angle mode. The driving method in the narrow viewing angle mode is the same as Embodiment 1.

Figure 16:
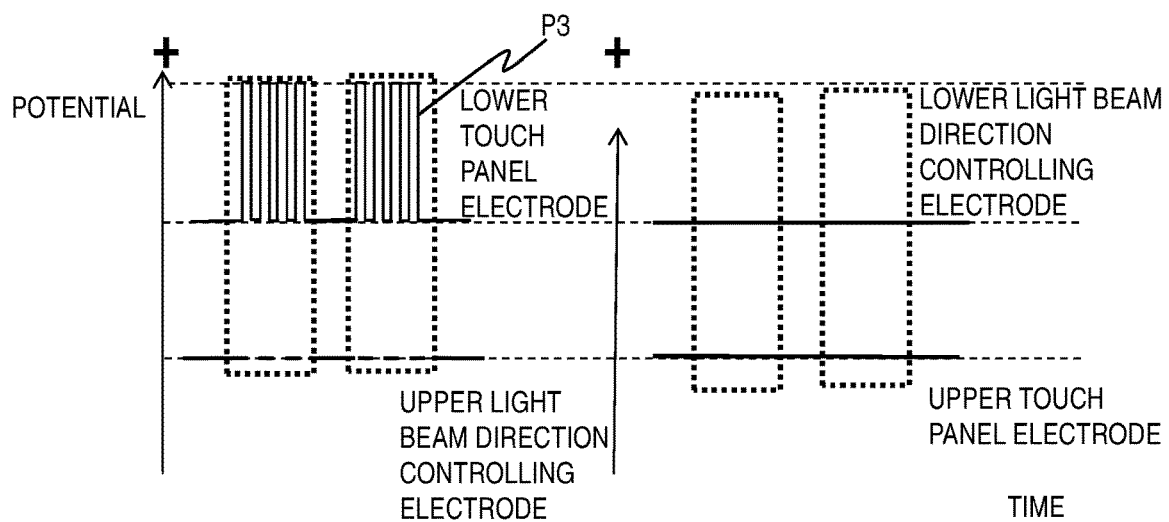
FIG. 16 is a diagram schematically illustrating the waveform of the driving signal given to each electrode in the wide viewing angle state according to Embodiment 2.

FIG. 16 is a diagram schematically illustrating the waveform of the driving signal given to each electrode in the wide viewing angle state. Embodiment 2 differs from Embodiment 1 in that the lower touch panel electrode 13 is applied with a touch panel driving signal of a rectangular wave having a pulse P3 of the positive direction, with reference to the potential given to the lower light beam direction controlling electrode 16, for example.

Even when the pulse P3 is in the ON state (where the pulse is being output), the lower touch panel electrode 13 is maintained at the higher potential than the upper light beam direction controlling electrode 18, which faces the lower touch panel electrode 13. Thus, the pulse width in the wide viewing angle mode of this embodiment can be greater than that of the mutual capacitance mode of Embodiment 1 (for example, the pulse width is 1 to 30 μs).

Figure 17:
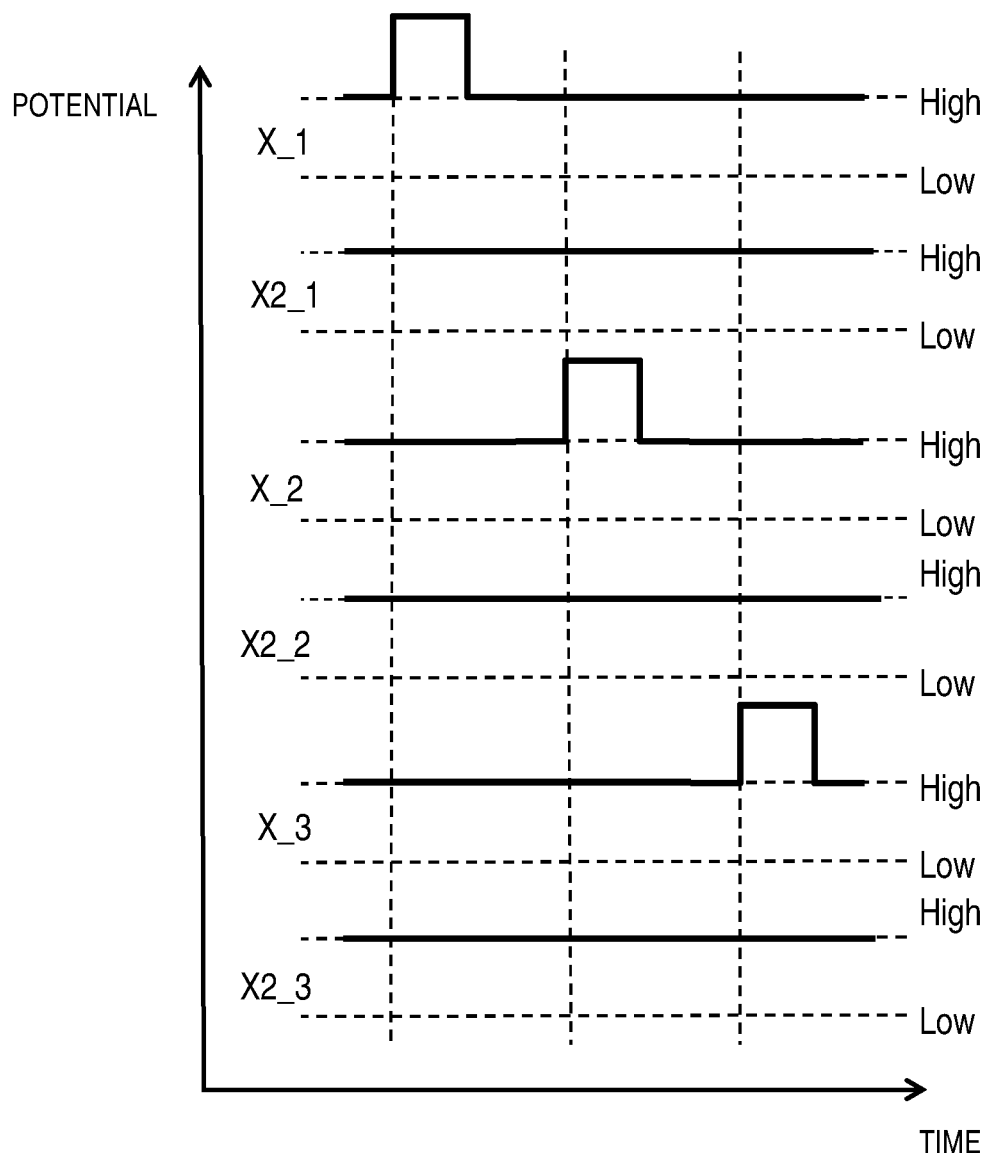
FIG. 17 illustrates an example of the waveform of the driving potential (driving signal) given to the lower electrode in the mutual capacitance mode and the wide viewing angle mode according to Embodiment 2.

FIG. 17 illustrates an example of the waveform of the driving potential (driving signal) given to the lower electrode 7 in the mutual capacitance mode and the wide viewing angle mode. After receiving a notification of the mutual capacitance mode from the main controller 21, and a notification of the wide viewing angle mode from the viewing angle controller 24, the timing controller 25 sequentially selects the lower touch panel electrodes 13.

The timing controller 25 measures the capacitance of each of the upper touch panel electrodes 12 while giving the driving potential to the selected lower touch panel electrode 13. The timing controller 25 may measure the capacitance of the upper touch panel electrodes 12 by selecting one by one sequentially, or measure the capacitance between all the upper touch panel electrodes 12 and the selected lower touch panel electrode 13. The touch coordinates calculator 23 calculates the touch coordinates based on the measured capacitance.

In the example of FIG. 17, the timing controller 25 selects the lower touch panel electrodes 13 in the order of X_1 electrode, X_2 electrode, and X_3 electrode. As illustrated in FIG. 17, an AC signal is sequentially given to the selected lower touch panel electrodes 13 for capacitance measurement. In the example of FIG. 17, the driving signal given to the lower touch panel electrodes 13 is a rectangular wave emitting a pulse from a prescribed high potential (High in FIG. 17) toward the positive direction. The pulse is output in the same order as the selected electrode, and the pulse output periods of the respective lower touch panel electrodes 13 do not overlap with each other. The driving potential waveform for the capacitance measurement may be of any shape as long as it is appropriate for the touch detection by the light beam direction controlling touch panel 1.

In the mutual capacitance mode and the wide viewing angle state of this embodiment, the waveform of the driving potential (driving signal) given to the upper electrode 6 is the same as that of FIG. 10B of Embodiment 1, and is therefore not illustrated in the figure.

This way, as described above, the lower light beam direction controlling electrodes 16 are maintained at a higher potential than the upper touch panel electrodes 12 that face the lower light beam direction controlling electrodes 16, and the lower touch panel electrodes 13 are maintained at a higher potential than the upper light beam direction controlling electrodes 18 that face the lower touch panel electrodes 13. This way, the electrophoresis particles of the electrophoresis elements 14 are concentrated on the lower electrode 7, and the wide viewing angle state can be achieved.

Figure 18A:
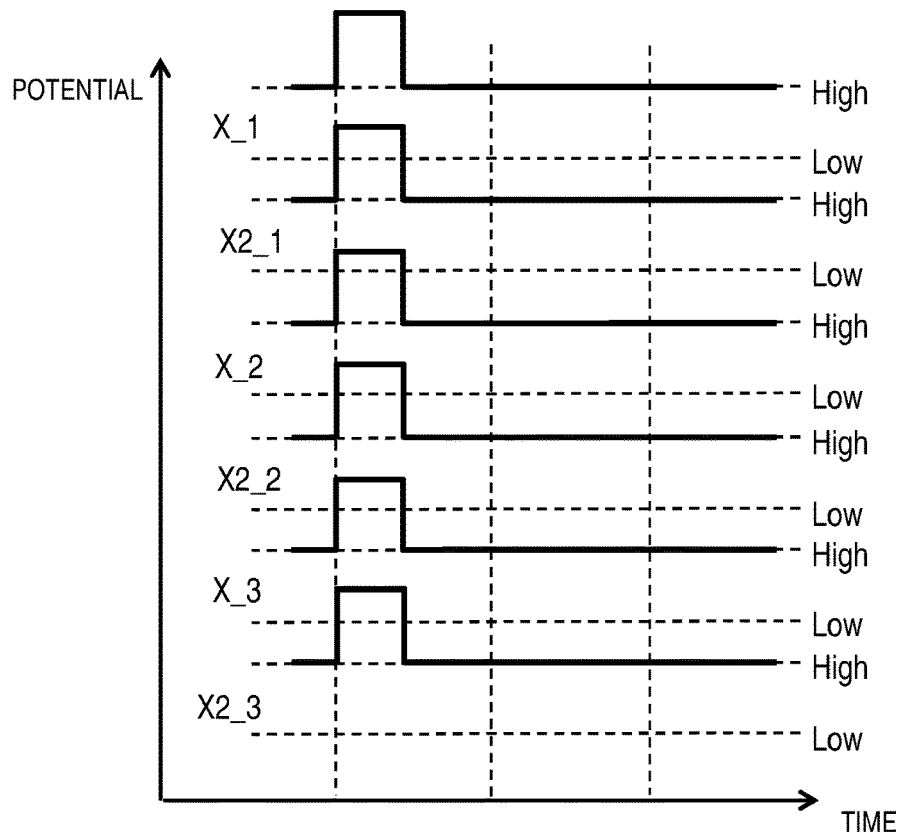
FIG. 18A illustrates an example of the waveform of the driving potential (driving signal) given to the lower electrode in the self-capacitance mode and wide viewing angle mode according to Embodiment 2.
Figure 18B:
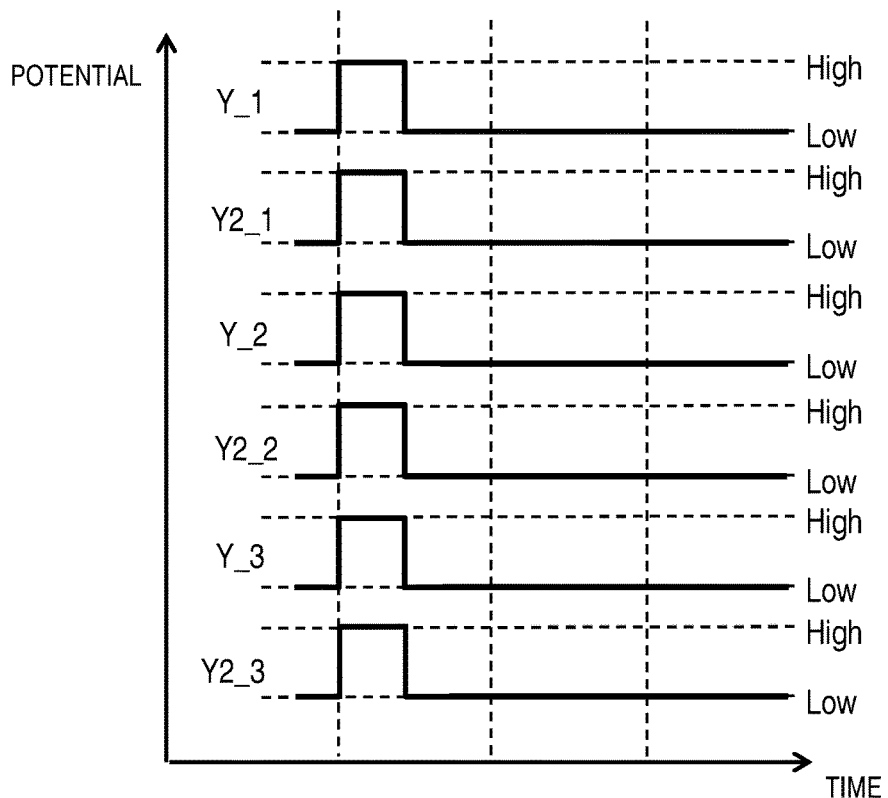
FIG. 18B illustrates an example of the waveform of the driving potential (driving signal) given to the upper electrode in the self-capacitance mode and the wide viewing angle mode according to Embodiment 2.

FIG. 18A illustrates an example of the waveform of the driving potential (driving signal) given to the lower electrode 7 in the self-capacitance mode and wide viewing angle mode. FIG. 18B illustrates an example of the waveform of the driving potential (driving signal) given to the upper electrode 6 in the self-capacitance mode and the wide viewing angle mode.

After receiving a notification of the self-capacitance mode from the main controller 21, and a notification of the wide viewing angle mode from the viewing angle controller 24, the timing controller 25 measures the capacitance of all the upper touch panel electrodes 12 and all the lower touch panel electrodes 13 while giving the driving potential to all the upper touch panel electrodes 12 and all the lower touch panel electrodes 13. Alternatively, the timing controller 25 may be configured to sequentially select each upper touch panel electrode 12 and lower touch panel electrode 13, and give the driving signal to the selected electrode to measure the capacitance. The touch coordinates calculator 23 calculates the touch coordinates based on the measured capacitance.

In the example of FIG. 18A, an AC signal is given to the lower touch panel electrodes 13 and the lower light beam direction controlling electrodes 16 at the same time. In the example of FIG. 18A, the driving signal given to each lower touch panel electrodes 13 and each lower light beam direction controlling electrode 16 is a rectangular wave emitting a pulse from a prescribed high potential (High in FIG. 18A) toward the positive direction. The driving potential waveform for the capacitance measurement may be of any shape as long as it is appropriate for the touch detection by the light beam direction controlling touch panel 1.

The driving signal given to each upper touch panel electrodes 12 and each upper light beam direction controlling electrode 18 is a rectangular wave emitting a pulse from a prescribed low potential (Low in FIG. 18B) toward the positive direction. This rectangular wave is in the same shape as the rectangular wave indicated by the driving signal given to the lower touch panel electrodes 13 and the lower light beam direction controlling electrodes 16.

This way, as described above, the lower light beam direction controlling electrodes 16 are maintained at a higher potential than the upper touch panel electrodes 12 that face the lower light beam direction controlling electrodes 16, and the lower touch panel electrodes 13 are maintained at a higher potential than the upper light beam direction controlling electrodes 18 that face the lower touch panel electrodes 13. This way, the electrophoresis particles of the electrophoresis elements 14 are concentrated on the lower electrode 7, and the wide viewing angle state can be achieved.

In the mutual capacitance mode of this embodiment, the size of the electric field for touch panel in the wide viewing angle (potential difference between the lower touch panel electrodes 13 and the upper touch panel electrodes 12 when the pulse is output) is greater than the size of the electric field for touch panel in the narrow viewing angle mode. That is, between the wide viewing angle mode and the narrow viewing angle mode, the period required to charge the electrostatic capacitance differs from each other, although the size of the electrostatic capacitance for touch panel is the same.

The period required for the electrostatic capacitance to be charged to a prescribed voltage is longer as the voltage gets higher as in Formula 1 below. Thus, the main controller 21 determines the charge time of the electrostatic capacitance and the measurement timing of the electrostatic capacitance so that the amount of electric charges is the same between the wide viewing angle mode and the narrow viewing angle mode based on Formula 2 below, for example, and provides the timing controller 25 with the information of the charge time and the timing.

$$e_C(t) = E - E \cdot e^{-t/RC} \quad \text{(Formula 1)}$$

($e_C$ is the voltage of the capacitor, E is the voltage applied to the electrode, t is the charge time, R is the resistance, and C is the electrostatic capacitance).

$$q(t) = CE - CE^{-t/RC} \quad \text{(Formula 2)}$$

(q is the voltage of the capacitor, E is the voltage applied to the electrode, t is the charge time, R is the resistance, and C is the electrostatic capacitance).

Embodiment 3

Figure 19:
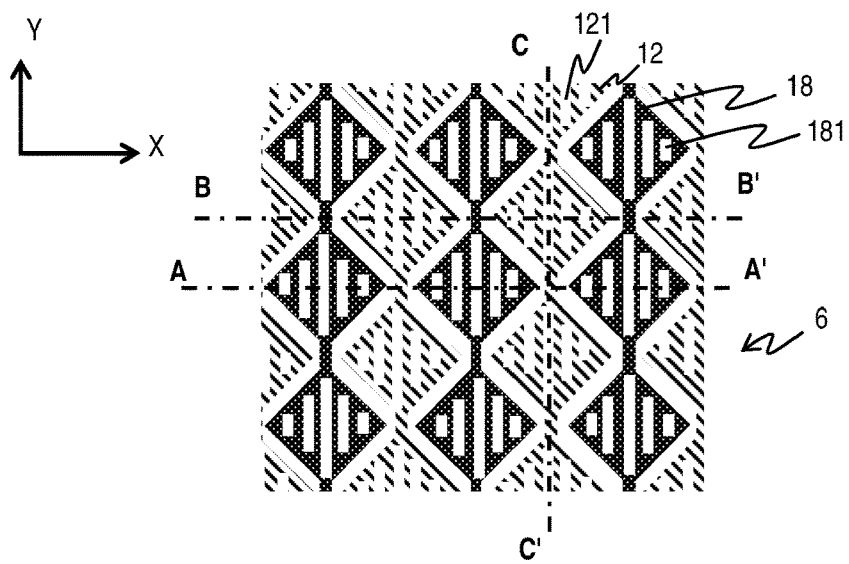
FIG. 19 is a plan view schematically illustrating a configuration example of the upper electrode according to Embodiment 3.

The light beam direction controlling touch panel 1 of this embodiment differs from the light beam direction controlling touch panel 1 of Embodiment 1 in that the upper touch panel electrodes 12 also have openings formed therein. FIG. 19 is a plan view schematically illustrating a configuration example of the upper electrode 6 of this embodiment. The upper touch panel electrodes 12 have openings 121 formed therein. In the example of FIG. 19, each electrode piece of the upper touch panel electrodes 12 has a plurality of openings 121 in a rectangular shape where the Y-axis direction is the longitudinal direction. The shape of the openings 121 is not limited to a rectangular shape, and the openings 121 may be formed in any shape.

Figure 20:
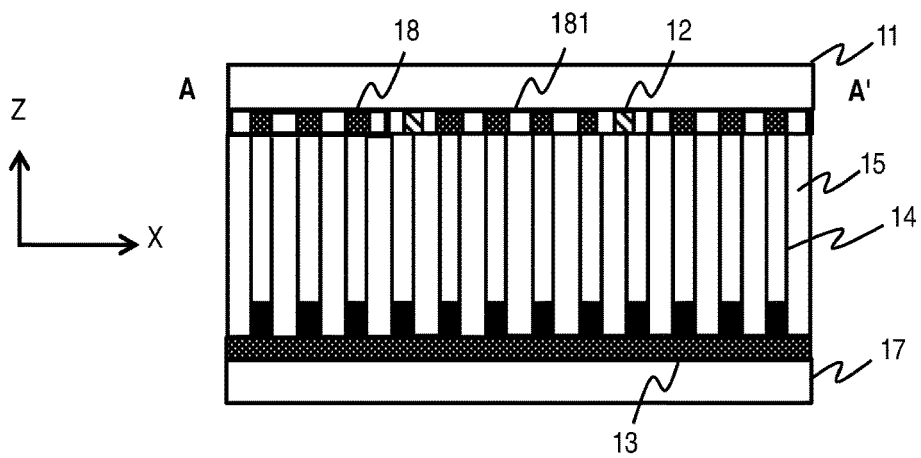
FIG. 20 is a cross-sectional view illustrating an example of the cross-sectional structure of the light beam direction controlling touch panel in the wide viewing angle state, taken along the line AA' of FIG. 19.
Figure 21:
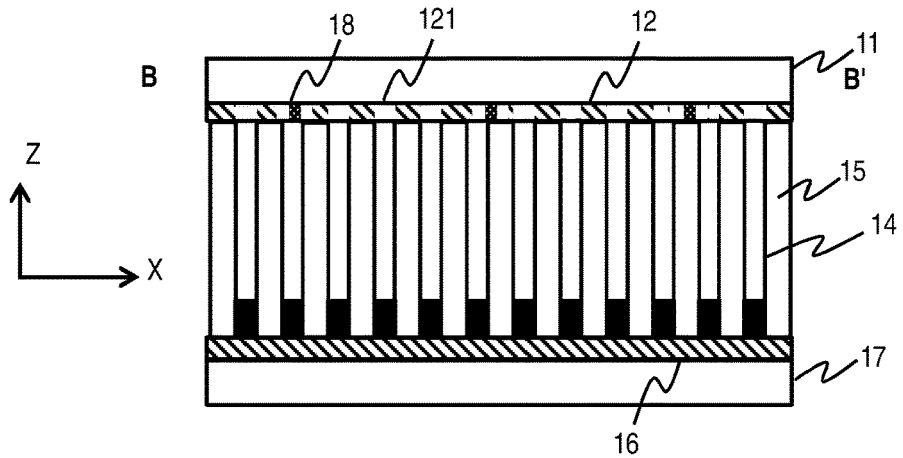
FIG. 21 is a cross-sectional view illustrating an example of the cross-sectional structure of the light beam direction controlling touch panel, taken along the line BB' of FIG. 19.
Figure 22:
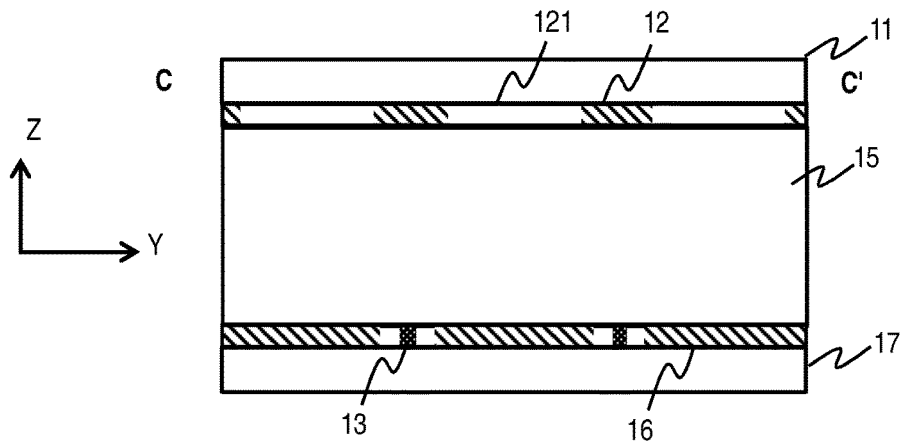
FIG. 22 is a cross-sectional view illustrating an example of the cross-sectional structure of the light beam direction controlling touch panel, taken along the line CC' of FIG. 19.

FIG. 20 is a cross-sectional view illustrating an example of the cross-sectional structure of the light beam direction controlling touch panel 1 in the wide viewing angle state, taken along the line AA' of FIG. 19. FIG. 21 is a cross-sectional view illustrating an example of the cross-sectional structure of the light beam direction controlling touch panel 1, taken along the line BB' of FIG. 19. FIG. 22 is a cross-sectional view illustrating an example of the cross-sectional structure of the light beam direction controlling touch panel 1, taken along the line CC' of FIG. 19.

The openings 121 formed in the upper touch panel electrodes 12 are formed so as to overlap in position with the light-transmissive region 15. It is preferable that the openings 121 do not overlap the electrophoresis elements 14. Thus, it is preferable that the width (in the X-axis direction) of the openings 121 be smaller than the width of the light-transmissive region 15. All the electrophoresis elements 14 are sandwiched by at least one upper touch panel electrode 12 or upper light beam direction controlling electrode 18, and at least one lower touch panel electrode 13 or lower light beam direction controlling electrode 16.

Figure 23:
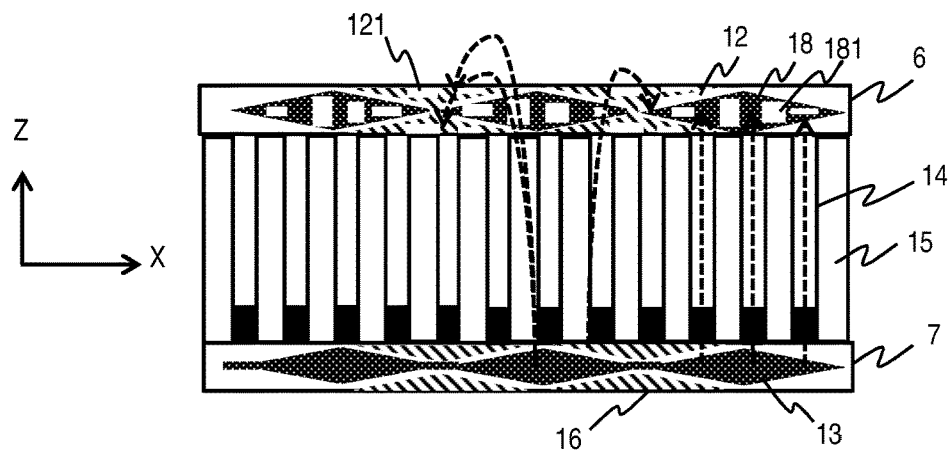
FIG. 23 is a cross-sectional view illustrating an example of the cross-sectional structure of the light beam direction controlling touch panel in the wide viewing angle state according to Embodiment 3.

FIG. 23 is a cross-sectional view illustrating an example of the cross-sectional structure of the light beam direction controlling touch panel 1 in the wide viewing angle state. For ease of explanation, in the example of FIG. 23, the bottom surface (XY plane) of the upper electrode 6 and the top surface (XY plane) of the lower electrode 7 are drawn on the XZ plane, and the upper transparent substrate 11 and the lower transparent substrate 17 are not illustrated.

In FIG. 23, the lower touch panel electrodes 13 are controlled to have a higher potential than the upper light beam direction controlling electrodes 18 that face the lower touch panel electrodes 13. The lower light beam direction controlling electrodes 16 are controlled to have a higher potential than the upper touch panel electrodes 12 that face the lower light beam direction controlling electrodes 16. This way, an electric field from the lower touch panel electrodes 13 to the non-opening areas of the upper light beam direction controlling electrodes 18 is formed, and an electric field from the lower light beam direction controlling electrodes 16 to the upper touch panel electrodes 12 is formed, which thereby realize the light beam direction controlling function.

In this state, if an object touches the upper transparent substrate 11, a part of the electric field, which is formed from the lower touch panel electrodes 13 to the upper touch panel electrodes 12 via the openings 181 of the upper light beam direction controlling electrodes 18, is taken away by the object, which causes the capacitance to change. Also, a part of the electric field, which is formed from the lower light beam direction controlling electrodes 16 to the upper light beam direction controlling electrodes 18 via the openings 121 of the upper touch panel electrodes 12, is taken away by the object, which causes the capacitance to change. The touch panel function is made possible by those electric fields.

That is, in the light beam direction controlling touch panel 1 of this embodiment, not only the upper touch panel electrodes 12 and the lower touch panel electrodes 13, but also the upper light beam direction controlling electrodes 18 and the lower light beam direction controlling electrodes 16 act as both the touch panel electrodes and the light beam direction controlling electrodes. This improves the resolution of a touch panel.

Specifically, in this embodiment, in the mutual capacitance mode, both the lower touch panel electrodes 13 and the lower light beam direction controlling electrodes 16 act as the transmission electrode (driving electrode), and both the upper touch panel electrodes 12 and the upper light beam direction controlling electrodes 18 act as the reception electrode (driving electrode).

Thus, in this embodiment, in the mutual electrode mode, the timing controller 25 selects each lower touch panel electrode 13 and each lower light beam direction controlling electrode 16 sequentially. The timing controller 25 measures the capacitance of each of the upper touch panel electrodes 12 and the upper light beam direction controlling electrodes 18 while giving the driving potential to the selected lower touch panel electrode 13 and lower light beam direction controlling electrode 16.

In the mutual capacitance mode, the timing controller 25 may measure the capacitance by selecting each upper touch panel electrode 12 and upper light beam direction controlling electrode 18 sequentially, or measure the capacitance between all the upper touch panel electrodes 12 and upper light beam direction controlling electrodes 18 and the selected lower touch panel electrode 13 and lower light beam direction controlling electrode 16. The touch coordinates calculator 23 calculates the touch coordinates based on the measured capacitance.

In the mutual capacitance mode, by giving the pulses, which were given to the X_1 electrode, X_2 electrode, and X_3 electrode in this order in Embodiments 1 and 2 (FIGS. 10A, 14A, and 17), to X_1, X2_1, X_2, X2_2, X_3, and X2_3 in this order, both the lower touch panel electrodes 13 and the lower light beam direction controlling electrodes 16 can function as the transmission electrodes. The driving potential given to the upper touch panel electrodes 12 and the upper light beam direction controlling electrodes 18 is the same as that of Embodiment 1.

In the self-capacitance mode, both the lower touch panel electrodes 13 and the lower light beam direction controlling electrodes 16 act as the X electrode, and both the upper touch panel electrodes 12 and the upper light beam direction controlling electrodes 18 act as the Y electrode.

In the self-capacitance mode, the timing controller 25 measures the capacitance of all the upper touch panel electrodes 12 and all the upper light beam direction controlling electrodes 18, and all the lower touch panel electrodes 13 and all the lower light beam direction controlling electrodes 16, while giving the driving potential to all the upper touch panel electrodes 12 and all the upper light beam direction controlling electrodes 18, and all the lower touch panel electrodes 13 and all the lower light beam direction controlling electrodes 16.

Alternatively, the timing controller 25 may be configured to sequentially select each of the upper touch panel electrodes 12, upper light beam direction controlling electrode 18, lower touch panel electrodes 13, and lower light beam direction controlling electrode 16, and give the driving signal to the selected electrode to measure the capacitance thereof. The touch coordinates calculator 23 calculates the touch coordinates based on the measured capacitance. The driving potential given to each electrode in the self-capacitance mode is the same as those of Embodiments 1 and 2.

In this embodiment, the upper touch panel electrodes 12 and the upper light beam direction controlling electrodes 18 can be considered the same, and therefore, the upper touch panel electrode driver 26 and the upper light beam direction controlling electrode driver 27 may be integrally formed as one function part. Similarly, the lower touch panel electrodes 13 and the lower light beam direction controlling electrodes 16 can be considered the same, and therefore, the lower touch panel electrode driver 28 and the lower light beam direction controlling electrode driver 29 may be integrally formed as one function part.

Embodiment 4

The light beam direction controlling touch panel 1 of this embodiment differs from Embodiment 1 in the arrangement and shape of the electrodes in the upper electrode 6 and the lower electrode 7.

Figure 24:
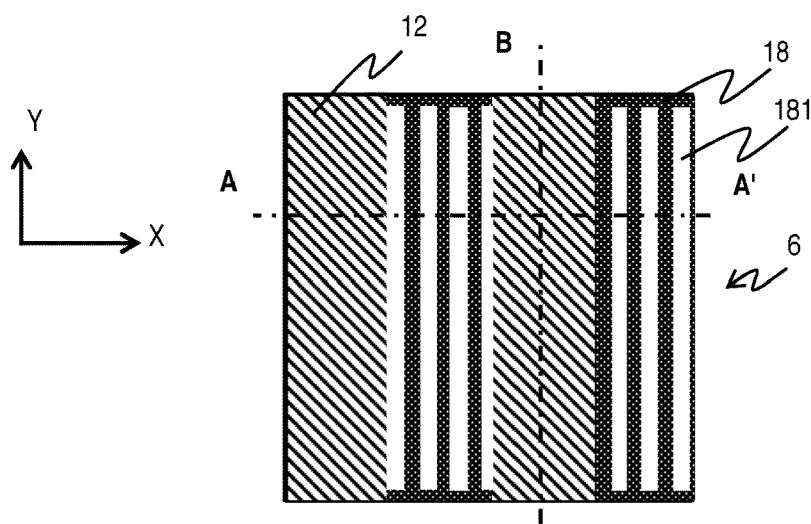
FIG. 24 is a plan view schematically illustrating a configuration example of the upper electrode 6 according to Embodiment 4.

FIG. 24 is a plan view schematically illustrating a configuration example of the upper electrode 6 of this embodiment. The upper electrode 6 includes a plurality of upper touch panel electrodes 12 and a plurality of upper light beam direction controlling electrodes 18. The plurality of upper touch panel electrodes 12 each extend in the Y-axis direction, and is arrayed along the X axis direction at a certain interval. Each of the upper touch panel electrodes 12 is in a rectangular shape with the Y-axis direction being the longitudinal direction, for example.

The plurality of upper light beam direction controlling electrodes 18 each extend in the Y-axis direction, and is arrayed along the X axis direction at a certain interval. Each of the upper light beam direction controlling electrodes 18 is in a rectangular shape with the Y-axis direction being the longitudinal direction, for example. The upper light beam direction controlling electrode 18 has at least one opening 181 formed therein. The opening 181 is in a rectangular shape with the Y-axis direction being the longitudinal direction, for example.

The upper touch panel electrodes 12 and the upper light beam direction controlling electrodes 18 are arranged alternately along the X-axis direction. The gap between the upper light beam direction controlling electrode 18 and the upper touch panel electrode 12 may be filled with an insulating material (such as silicon nitrogen), or remain unfilled.

Figure 25:
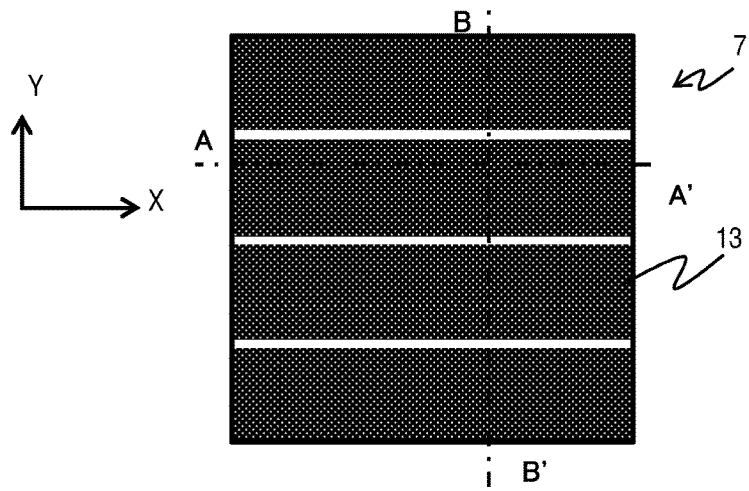
FIG. 25 is a plan view schematically illustrating a configuration example of the lower electrode according to Embodiment 4.

FIG. 25 is a plan view schematically illustrating a configuration example of the lower electrode 7 of this embodiment. The lower electrode 7 includes a plurality of lower touch panel electrodes 13. The plurality of lower touch panel electrodes 13 respectively extend in the X-axis direction on the lower transparent substrate 17, and are arrayed at a certain interval along the Y-axis direction. Each of the lower touch panel electrodes 13 is in a rectangular shape with the X-axis direction being the longitudinal direction. The gap between the respective lower touch panel electrodes 13 may be filled with an insulating material (such as silicon nitrogen), or remain unfilled, for example.

Figure 26:
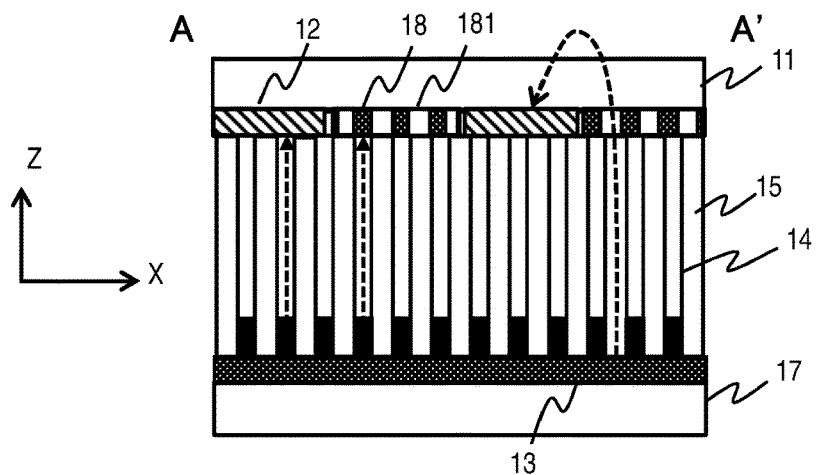
FIG. 26 is a cross-sectional view illustrating an example of the cross-sectional structure of the light beam direction controlling touch panel in the wide viewing angle state, taken along the line AA' of FIGS. 24 and 25.
Figure 27:
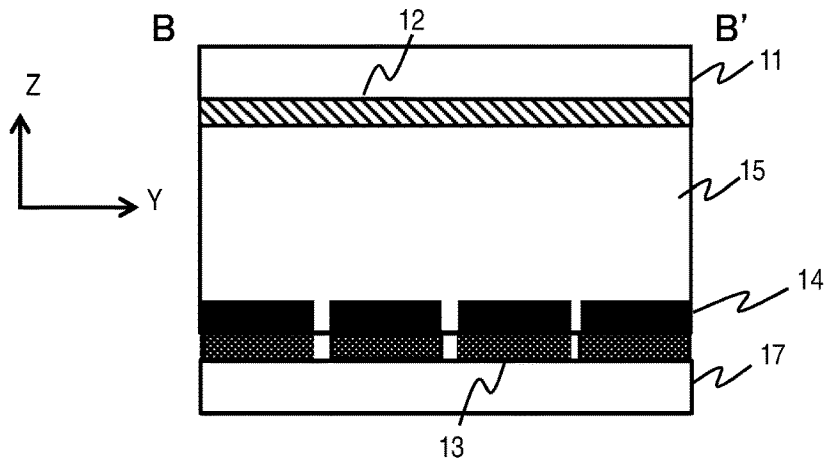
FIG. 27 is a cross-sectional view illustrating an example of the cross-sectional structure of the light beam direction controlling touch panel in the wide viewing angle state, taken along the line BB' of FIGS. 24 and 25.

FIG. 26 is a cross-sectional view illustrating an example of the cross-sectional structure of the light beam direction controlling touch panel 1 in the wide viewing angle state, taken along the line AA' of FIGS. 24 and 25. FIG. 27 is a cross-sectional view illustrating an example of the cross-sectional structure of the light beam direction controlling touch panel 1 in the wide viewing angle state, taken along the line BB' of FIGS. 24 and 25.

The opening 181 formed in the upper light beam direction controlling electrode 18 is formed so as to overlap in position with the light-transmissive region 15. It is preferable that the opening 181 do not overlap the electrophoresis elements 14. Thus, it is preferable that the width (in the X-axis direction) of the opening 181 be smaller than the width of the light-transmissive region 15.

All the electrophoresis elements 14 are sandwiched by at least one upper touch panel electrode 12 or upper light beam direction controlling electrode 18, and at least one lower touch panel electrode 13. The electrophoresis element 14 is perpendicular with the lower touch panel electrode 13 on the XY plane.

As illustrated in FIG. 27, the lower touch panel electrodes 13 are controlled to have a higher potential than the upper light beam direction controlling electrodes 18 and the upper touch panel electrodes 12 facing the lower touch panel electrodes 13. This way, an electric field from the lower touch panel electrodes 13 to the non-opening area of the upper light beam direction controlling electrodes 18 is formed, and an electric field from the lower touch panel electrodes 13 to the upper touch panel electrodes 12 is formed, which thereby realize the light beam direction controlling function.

In this state, if an object touches the upper transparent substrate 11, an electric field is formed from the lower touch panel electrodes 13 to the upper touch panel electrodes 12 via the opening 181 of the upper light beam direction controlling electrodes 18. The touch panel function is made possible by this electric field. The driving potential given to each electrode in the self-capacitance mode is the same as those of Embodiments 1 and 2, and the explanation thereof is not repeated.

Similar to the embodiment illustrated in FIG. 19, in the light beam direction controlling touch panel 1 of this embodiment, the upper touch panel electrodes 12 may also have an opening formed therein. This way, not only the upper light beam direction controlling electrodes 18 and the lower touch panel electrodes 13, but also the upper touch panel electrodes 12 and the lower touch panel electrodes 13 act as both the touch panel electrode and the light beam direction controlling electrode. This improves the resolution of a touch panel.

Embodiments of the present invention were explained above, but the present invention is not limited to those embodiments. Each element of the embodiments described above may be easily modified, added or changed without departing from the scope of the present invention by a person skilled in the art. It is possible to replace a part of the configuration of one embodiment with the configuration of another embodiment, or it is possible to add a configuration of one embodiment to a configuration of another embodiment.

What is claimed is:

1. A light beam direction controlling touch panel device, comprising:
   an upper transparent substrate;
   a lower transparent substrate;
   a plurality of upper light beam direction controlling electrodes and a plurality of upper touch panel electrodes arranged alternately along a first direction on a bottom surface of the upper transparent substrate;
   a plurality of lower touch panel electrodes disposed on a top surface of the lower transparent substrate and facing the upper light beam direction controlling electrodes;
   a plurality of electrophoresis elements sandwiched between the plurality of upper light beam direction controlling electrodes and the plurality of lower touch panel electrodes, each of the plurality of electrophoresis elements including colored electrophoresis particles and dispersion medium;
   a plurality of light-transmissive regions sandwiched between the upper transparent substrate and the lower transparent substrate, the plurality of light-transmissive regions surrounded by the electrophoresis elements; and
   a controller,
   wherein the plurality of upper light beam direction controlling electrodes each include an opening that overlaps in position with the light-transmissive region,
   wherein the controller is configured to:
   supply a driving potential to the plurality of lower touch panel electrodes in capacitance measurement for detecting a touch position, thereby forming an electric field from the plurality of lower touch panel electrodes to the plurality of upper touch panel electrodes through the opening; and
   supply a driving potential to the plurality of upper light beam direction controlling electrodes in accordance with the driving potential given to the plurality of lower touch panel electrodes, thereby switching between a dispersed state and a concentrated state of the colored electrophoresis particles in the plurality of electrophoresis elements.

2. The light beam direction controlling touch panel device according to claim 1,
   wherein, in a wide viewing angle mode, the controller is configured to:
   maintain the concentrated states of the colored electrophoresis particles in the plurality of electrophoresis elements; and
   give a potential to the plurality of upper light beam direction controlling electrodes, the potential having a constant difference from the driving potential given to the plurality of lower touch panel electrodes.

3. The light beam direction controlling touch panel device according to claim 1,
   wherein, in a narrow viewing angle mode, the controller is configured to:
   maintain the dispersed state of the colored electrophoresis particles in the plurality of electrophoresis elements; and
   give the same potential to the plurality of upper light beam direction controlling electrodes and the plurality of lower touch panel electrodes.

4. The light beam direction controlling touch panel device according to claim 1, wherein the opening does not overlap in position with the electrophoresis elements.

5. The light beam direction controlling touch panel device according to claim 1, wherein the controller gives, to the plurality of lower touch panel electrodes, a driving potential indicated by a rectangular wave including a pulse from the reference potential, and
   wherein a pulse width of said pulse is too small for the electrophoresis particles of the electrophoresis elements to follow.

6. The light beam direction controlling touch panel device according to claim 1,
   wherein the controller is configured to:
   in a wide viewing angle mode, maintain the concentrated states of the colored electrophoresis particles in the plurality of electrophoresis elements; and give a potential to the plurality of upper light beam direction controlling electrodes, the potential having a constant difference from the driving potential given to the plurality of lower touch panel electrodes, and in a narrow viewing angle mode, maintain the dispersed state of the colored electrophoresis particles in the plurality of electrophoresis elements; and give the same potential to the plurality of upper light beam direction controlling electrodes and the plurality of lower touch panel electrodes, wherein a potential difference between the plurality of lower touch panel electrodes and the plurality of upper touch panel electrodes when the capacitance of the plurality of lower touch panel electrodes is being charged differs between the wide viewing angle mode and the narrow viewing angle mode, and wherein the controller determines a capacitance charging time so that an amount of charges in the plurality of lower touch panel electrodes is the same between the wide viewing angle mode and the narrow viewing angle mode.

7. The light beam direction controlling touch panel device according to claim 1, further comprising a plurality of lower light beam direction controlling electrodes disposed on a top surface of the lower transparent substrate such that the lower light beam direction controlling electrodes and the lower touch panel electrodes are arranged alternately along a second direction perpendicular to the first direction, the plurality of lower light beam direction controlling electrodes facing the upper touch panel electrodes, wherein the plurality of electrophoresis elements are sandwiched by the plurality of upper touch panel electrodes and the plurality of lower light beam direction controlling electrodes, and wherein the controller is configured to supply a driving potential to the plurality of lower light beam direction controlling electrodes in accordance with the driving potential given to the plurality of upper touch panel electrodes, thereby switching between a dispersed state and a concentrated state of the colored electrophoresis particles in the plurality of electrophoresis elements.

8. The light beam direction controlling touch panel device according to claim 7, wherein the plurality of upper touch panel electrodes each include an opening that overlaps in position with the light-transmissive region, and wherein a driving potential is supplied to the plurality of lower light beam direction controlling electrodes in capacitance measurement for detecting a touch position, thereby forming an electric field from the plurality of lower light beam direction controlling electrodes to the plurality of upper light beam direction controlling electrodes through the opening of the plurality of upper touch panel electrodes.

9. The light beam direction controlling touch panel device according to claim 7, wherein the plurality of electrophoresis elements extend in the second direction and is arrayed along the first direction, wherein the plurality of lower touch panel electrodes, the plurality of lower light beam direction controlling electrodes, the plurality of upper touch panel electrodes, and the plurality of upper light beam direction controlling electrodes each have a configuration where a plurality of electrode pieces are connected to each other, wherein each electrode piece of the plurality of lower touch panel electrode faces one of the electrode pieces of the plurality of upper light beam direction controlling electrodes, wherein each electrode piece of the plurality of lower light beam direction controlling electrodes faces one of the electrode pieces of the plurality of upper touch panel electrodes, wherein the plurality of lower touch panel electrodes and the plurality of lower light beam direction controlling electrodes extend in the first direction and is arrayed along the second direction, and wherein the plurality of upper touch panel electrodes and the plurality of upper light beam direction controlling electrodes extend in the second direction and is arrayed along the first direction.

10. The light beam direction controlling touch panel device according to claim 1, wherein the plurality of electrophoresis elements extend in a second direction perpendicular to the first direction, and is arrayed along the first direction, wherein the plurality of lower touch panel electrodes, the plurality of upper touch panel electrodes, and the plurality of upper light beam direction controlling electrodes each have a rectangular shape, wherein the plurality of lower touch panel electrodes extend in the first direction and is arrayed along the second direction, and wherein the plurality of upper touch panel electrodes and the plurality of upper light beam direction controlling electrodes extend in the second direction and is arrayed along the first direction.

* * * * *